US012481690B2

(12) United States Patent
Will et al.

(10) Patent No.: US 12,481,690 B2
(45) Date of Patent: Nov. 25, 2025

(54) METHOD FOR FILTERING SEARCH RESULTS BASED ON SEARCH TERMS IN CONTEXT

(71) Applicant: ESI Laboratory, LLC, Miami, FL (US)

(72) Inventors: Michael Alistair Will, Miami, FL (US); Neil Andrew Bradley, Woodford Green (GB)

(73) Assignee: ESI Laboratory, LLC, Miami, FL (US)

( * ) Notice: Subject to any disclaimer, the term of this patent is extended or adjusted under 35 U.S.C. 154(b) by 0 days.

(21) Appl. No.: 18/871,041

(22) PCT Filed: Jun. 9, 2023

(86) PCT No.: PCT/US2023/024931
§ 371 (c)(1),
(2) Date: Dec. 2, 2024

(87) PCT Pub. No.: WO2023/244505
PCT Pub. Date: Dec. 21, 2023

(65) Prior Publication Data
US 2025/0181625 A1    Jun. 5, 2025

Related U.S. Application Data

(60) Provisional application No. 63/352,733, filed on Jun. 16, 2022.

(51) Int. Cl.
*G06F 16/335*    (2019.01)
*G06F 16/338*    (2019.01)
*G06Q 50/18*    (2012.01)

(52) U.S. Cl.
CPC ......... *G06F 16/335* (2019.01); *G06F 16/338* (2019.01); *G06Q 50/18* (2013.01)

(58) Field of Classification Search
None
See application file for complete search history.

(56) References Cited

U.S. PATENT DOCUMENTS 6,434,556 B1 *   8/2002   Levin ................... G06F 16/358
                                                   707/999.005
10,740,557 B1 *  8/2020   Rajpara ............... G06F 16/3344
(Continued)

OTHER PUBLICATIONS

International Search Report and the Written Opinion of the International Searching Authority issued for International Patent Application No. PCT/US2023/024931, mailed on Aug. 31, 2023.

*Primary Examiner* — Kannan Shanmugasundaram
(74) *Attorney, Agent, or Firm* — Myers Wolin, LLC

(57) ABSTRACT

A computer-based method is provided for filtering search results, including first identifying a plurality of documents for review and then identifying an initial plurality of search term results potentially relevant to a search query, each search term result of the initial plurality containing an occurrence of a primary search term of a plurality of primary search terms. The method then proceeds to group identical search term results to define a plurality of groups of search term results. Representative search term result of each group are presented for evaluation. Upon receiving an indication from a user that the representative search term result is to be removed, the method then removes all search term results of the corresponding group to define a modified plurality of search term results. Each document from which any search result of the modified plurality of search term results is drawn is defined as a potentially relevant document.

20 Claims, 30 Drawing Sheets

(56) References Cited

U.S. PATENT DOCUMENTS

| | | | |
|---|---|---|---|
| 2010/0205020 A1* | 8/2010 | Losey | G06Q 20/20 |
| | | | 705/16 |
| 2010/0250580 A1* | 9/2010 | Balakrishnan | G06F 16/2428 |
| | | | 715/764 |
| 2010/0312725 A1 | 12/2010 | Privault et al. | |
| 2013/0179405 A1 | 7/2013 | Bunte et al. | |
| 2014/0201203 A1 | 7/2014 | Krishna et al. | |
| 2014/0317147 A1 | 10/2014 | Wu | |
| 2015/0074102 A1 | 3/2015 | Ismalon | |
| 2021/0004416 A1 | 1/2021 | Xiong et al. | |

* cited by examiner

|  |  |  | Responsive | Privileged | Confidential |
|---|---|---|---|---|---|
| Document based | 100% | Individual Full Document review | X | X | X |

FIG.1A

|  |  |  | Responsive | Privileged | Confidential |
|---|---|---|---|---|---|
| Fragment based | 80% | Semi-automatic Legend review |  | X |  |
|  |  | Semi-automatic Search term Result review | X | X | X |
|  |  | Automatic Bulk Document Cathegorization | X | X | X |
| Document based | 20% | Attorney Privilege review |  | X |  |
|  |  | Similar Document review | X | X | X |
|  |  | Individual Full Document review | X | X | X |

FIG.1B

| Meaning | Color |
|---|---|
| Metadata: | Fuchsia |
| General Email: | Gray |
| Privilege Email: | Gray |
| Search Term Phrase: | Red |
| Search Term Range: | "Red" w/5 "Red" |
| Search Term Variant: | RedBlackRed |
| Search Term Context: | Aqua |
| Search Term Result: | Aqua Red *Black* Red Aqua |
| Document Component Context: | Green |
| Document Component: | Green Aqua Red *Black* Red Aqua Green |
| Named Entity - Person | White |
| Named Entity - Organization | Teal |
| Legend: | *Blue* |
| Document Context: | Gold |
| Full Document: | Gold Green Aqua Red *Black* Red Aqua Green *Blue* Gold |

*FIG.3A*

| Document Text |
|---|
| From: business.head@company.com<br>To: human.resources@company.com<br>cc: general.counsel@company.com partner@biglaw.com; associate@biglawllp.com Date: 2022-01-01<br>Subject: XXX<br><br>Dear Mr. Human Resources<br><br>Lorem ipsum dolor sit amet, consectetur adipiscing elit, sed do eiusmod tempor incididunt ut labore et dolore magna aliqua. Ac tincidunt vitae semper quis lectus nulla. Massa placerat duis ultricies lacus sed turpis.<br><br>Nisi porta lorem mollis aliquam ut porttitor leo a. Nibh tortor id aliquet lectus proin nibh nisl. Scelerisque mauris pellentesque pulvinar pellentesque habitant morbi tristique senectus *legal opinion of* Counsel et. Nulla posuere sollicitudin aliquam ultrices sagittis orci. Libero id faucibus nisl tincidunt eget nullam non. Blandit cursus risus at ultrices mi tempus imperdiet nulla. Penatibus et magnis dis parturient montes nascetur ridiculus.<br><br>Vehicula ipsum a arcu cursus vitae congue. Consequat id porta nibh venenatis cras sed. Id volutpat lacus laoreet non curabitur. Tempor orci eu lobortis elementum nibh. Pretium aenean pharetra magna ac placerat vestibulum lectus.<br><br>I've copied this email to our legal team:<br>• Mr. General Counsel (generalcounsel@company.com) and Miss. Junior Counsel (junior.counsel@company.com) our in-house General Counsel; and<br>• Mr. Senior Partner (partner@biglawllp.com) and Ms. Junior Associate (associate@biglawllp.com) at Big Law LLP for his information.<br><br>Sincerely<br>Ms. Business Head |

| No. | Version | Documents | Paragraphs | Attorneys | Doc.types | Results (total: 5) Auto-select ALL Variants:⊙ | Privilege Status | Sel. |
|---|---|---|---|---|---|---|---|---|
| | | | | | | Select All on Page | ⊙?⊗ | ○ |
| R 1.0 | ● 2 | 2 | 2 | | doc | at the primary work site. Employees taking unfair advantage of the telecommuting privilege will face disciplinary action, up to and including termination. Consistent with | ⊙?⊗ | ○ |
| R 2.0 | ● 2 | 2 | 2 | | doc | at the primary work site. Employees taking unfair advantage of the telecommuting privilege will face disciplinary action, up to and including termination. Consistent with | ⊙?⊗ | ○ |
| R 3.0 | ● 2 | 1 | 1 | | doc | rt of ENA nor any individual obligation, right, term, condition, expectation, or privilege of employment not otherwise established by law. The policies herein may be amen | ⊙?⊗ | ○ |
| R 4.0 | ① | 1 | 1 | | doc | password set on your computer to prevent access from unauthorized individuals. Work products and programs developed by the telecommuter remain the property of ENA. Question | ⊙?⊗ | ○ |
| R 5.0 | ① | 1 | 1 | | doc | dential information should not be placed in your trash. They should be shredded. Work products and programs developed by the telecommuter remain the property of ENA. Question | ⊙?⊗ | ○ |

*FIG.6A*

| Quarantine | △ ✋ | ☐ ☑ ☐ | Images: 7 |

Font: ☐ ☐ ☐ ☐

Number of results: Paragraphs: 5

The telecommuter is required to comply with all ENA policies and guidelines, as well as ENA policies and procedures as if the employee were at the primary work site. Employees taking unfair advantage of the telecommuting privilege will face disciplinary action, up to and including termination. Consistent with the organization's expectations of information asset security for employees working at the office full-time, telecommuting employees will be expected to ensure the protection of proprietary company and customer information accessible from their home office. Steps include, but are not limited to, use of locked file cabinets, disk boxes and desks, regular password maintenance, and any other steps appropriate for the job and the environment.

The telecommuter is required to comply with all ENA policies and guidelines, as well as ENA policies and procedures as if the employee were at the primary work site. Employees taking unfair advantage of the telecommuting privilege will face disciplinary action, up to and including termination. Consistent with the organization's expectations of information asset security for employees working at the office full-time, telecommuting employees will be expected to ensure the protection of proprietary company and customer information accessible from their home office. Steps include, but are not limited to, use of locked file cabinets, disk boxes and desks, regular password maintenance, and any other steps appropriate for the job and the environment.

The policies and procedures communicated in this policy neither constitute nor imply a contract between ENA and any individual. This policy creates no obligation on the part of ENA nor any individual obligation, right, term, condition, expectation, or privilege of employment not otherwise established by law. The policies herein may be amended or withdrawn at any time by ENA without prior notice.
Have a password set on your computer to prevent access from unauthorized individuals. Work products and programs developed by the telecommuter remain the property of ENA.

*FIG. 6B*

| No. | Version | Documents | Paragraphs | Attorneys | Doc.types | Results (total: 5) Auto-select ALL Variants: ⊙ Select All on Page | Privilege Status ⊙?⊗ | Sel. |
|---|---|---|---|---|---|---|---|---|
| R 1.0 | ①  | 13 | 1 | | msg | dential information that is protected by the attorney-client and/or work product privileges. ********** EDRM Enron Email Data Set has been produced in EML, PST and NSF fo | ⊙?⊗ | ○ |
| R 2.0 | ①  | 13 | 1 | | msg | contain confidential information that is protected by the attorney-client and/or work product privileges. ********** EDRM Enron Email Data Set has been produced in EML, PST | ⊙?⊗ | ○ |

*FIG. 7A*

Quarantine:

Font:

Images: 1

Subject: July 27

From: "michelle cash"

Date: Mon, 19 June 2000  12:33:00-0400

To: "trey cash"

Trey, it looks like I may have to be in Portland for a mediation on July 27 -- with travel on the 26th and the 28th. Are you planning to be gone then, too? If not, I'll schedule this trip (wanna join me with CAC and spend the weekend?).

I hope you are having fun and not working too hard. Don't worry too much about me. Gwyn is coming over to join us for dinner tonight, and Kay is dropping by tomorrow -- she offered to watch Cameron if I needed to do stuff. I do miss you, though.

L, M

----------------------------------

Michelle Cash Enron North America Corp. 1400 Smith Street Houston, Texas 77002 (713) 853-6401 michelle.cash@enron.com This message may contain confidential information that is protected by the attorney-client and/or work product privileges.
**********************

EDRM Enron Email Data Set has been produced in EML, PST and NSF format by ZI Technologies Inc. This

*FIG. 7B*

```
<(From:|To:|BCC:|CC:::|[A-Za-z0-0.%+-]+@[A-Za-z0-9.-]+\.[A-Za-z]+
```

*FIG.8*

| cliffordchance.com | | split: ☐ ⇌ ↻ | | | ⊙⊗ | Ⓤ③ⒺⓈⓊ | ○ 21.0 |
|---|---|---|---|---|---|---|---|
| TITLE: Clifford Chance International Law Firm Global Law Experts | | DESCRIPTION: Clifford Chance is one of the world's pre-eminent law firms with significant depth and range of resources across five continents. Get in touch today for expert advice. | | | OWNER: Clifford Chance LLP | | |
| G cliffordchance.com | ben.ebdon @cliffordchance.com | ben ebdon ✓ ◆ ⇌ | ben.ebdon @cliffordchance.com | 0 0 0 0 1 1 | ▶ ⊘ ⊗ | Ⓤ③ⒺⓈⓊ | ○ 21.1 |
| G cliffordchance.com | christofer.millard @cliffordchance.com | christofer ✓ ◆ ⇌ millard | christofer.millard @cliffordchance.com | 0 0 0 0 1 1 | ▶ ⊘ ⊗ | Ⓤ③ⒺⓈⓊ | ○ 21.2 |
| G cliffordchance.com | lawrence.milner @cliffordchance.com | lawrence ✓ ◆ ⇌ milner | lawrence.milner @cliffordchance.com | 0 0 0 0 1 1 | ▶ ⊘ ⊗ | Ⓤ③ⒺⓈⓊ | ○ 21.3 |

*FIG. 9*

ESI STICS Federal Energy Regulatory Comission Investigation Batch: Lay No.:0001

| Welcome | Site | Subscribers | Launchpad | Clients | Matters | Search | Matter Statistics | Search Results | Document(s) | Create Domains List | Quarantined Docs. | Active Searches (0) | Quarantined | Batches | Find Text | Batch | Find E-mails | Load Documents | Metadata | DAT File | Words | Attorneys | Search Terms | Bulk Updates | Open |

| Status | Legends | | | | | | | | | | | | | | | | | | | | | | | |

Create E-mails List | E-mails List | Create Domains List | Domains List

Create E-mail Domain Names

Visit domain websites for details | Scrape Titles and Descriptions from Web-sites | Download Excel Report Web-site domains ⊞

Remove all domains

| Pos. | Domain Name | Title | Description | Confirm ☐ All | | |
|------|-------------|-------|-------------|---------|---|---|
| 1. | allenovery.com | | | ☐ | Select | Remove |
| 2. | bbc.co.uk | | | ☐ | Select | Remove |
| 3. | cliffordchance.com | | | ☐ | Select | Remove |
| 4. | quinnemanuel.com | | | ☐ | Select | Remove |

ESI STICS — Federal Energy Regulatory Comission Investigation — Batch: Lay No.:0001

Welcome | Site | Legends | Subscribers | Clients | Launchpad | Matters | Search | Matter Statistics | Search Results | Active Searches (0) | Create Domains List | Quarantined Docs. | Document(s) | Batches | Quarantined | Batch | Find Text | Load Documents | Find E-mails | Metadata | DAT File | Words | Download Excel Report | Attorneys | Search Terms | Bulk Updates | Open Status | Create E-mails List | E-mails List | Domains List

Create E-mail Domain Names

Visit domain websites for details | Scrape Titles and Descriptions from Web-sites | Download Excel Report Web-site domains Remove all domains

| Pos. | Domain Name | Title | Description | Confirm ☐ All | | |
|---|---|---|---|---|---|---|
| 1. | allenovery.com | International Law Firm with Global Reach - Allen & Overy | Allen & Overy is one of the world's top law firms with expertise in banking & finance, M&A, litigation, funds, IP, and related business solutions. | ☑ | Select | Remove |
| 2. | bbc.co.uk | BBC-Home | The best of the BBC, with the latest news and sport headlines, weather, TV & radio highlights and much more from across the whole of BBC Online. | ☐ | Select | Remove |
| 3. | cliffordchance.com | Clifford Chance International Law Firm Global Law Experts | Clifford Chance is one of the world's pre-eminent law firms, with significant depth and range of resources across five continents. Get in touch today for expert advice. | ☑ | Select | Remove |
| 4. | quinnemanuel.com | Quinn Emanuel Trial Lawyers - Quinn Emanuel Urquhart & Sullivan, LLP | Quinn Emanuel is the largest law firm in the world devoted solely to business litigation and arbitration. | ☑ | Select | Remove |

| Input Version | Stemmed Version | Lemmatized Version |
|---|---|---|
| NOTICE OF CONFIDENTIALITY: The information contained in and transmitted with this e-mail may be SUBJECT TO THE ATTORNEY–CLIENT and ATTORNEY WORK PRODUCT PRIVILEGE and is CONFIDENTIAL. It is intended only for the individual or entity designated above. You are hereby notified that any dissemination, distribution, copying use or reliance upon the information contained in and transmitted with this e-mail by or to anyone other than the addressee designated above by the sender is unauthorized and prohibited. If you have received dis e-mail in error, please notify the sender by reply immediately. Any e-mail erroneously transmitted to you should be immediately destroyed | NOTIC*E* OF CONFIDENTI*ALITY*: The inform*ation* contain*ed* in and transmit*ted* with this e-mail may be SUBJECT TO THE ATTORNEY--CLIENT and ATTORNEY WORK PRODUCT PRIVILEG*E* and is CONFIDENTI*AL*. It is intended only*i* for the individu*al* or entity*i* designat*ed* above. You are hereb*yi* notifi*ed* that any*i* dissemin*ation*, distribut*ion*, copy*ingi* use or relianc*e* upon the inform*ation* contain*ed* in and transmit*ted* with this e-mail by or to anyone other than the addresse*e* designat*ed* above by the sender is unauthoriz*ed* and strictl*yi* prohibit*ed*. If you have receiv*ed* this e-mail in error, please notif*yi* the sender by repl*yi* immedi*ately*. Any*i* e-i e-mail err*oneously* transmit*ted* to you should be immedi*ately* destroy*ed* | NOTICE OF CONFIDENTIALITY: The information contain*ed* in and transmit*ted* with this e-mail may be SUBJECT TO THE ATTORNEY–CLIENT and ATTORNEY WORK PRODUCT PRIVILEGE and *is*be CONFIDENTIAL. It *is*be intend*ed* only for the individual or entity designat*ed* above. You *are*be hereby notif*ied*y that any dissemination, distribution, copying use or reliance upon the information contain*ed* in and transmit*ted* with this e-mail by or to anyone other than the addressee designat*ed* above by the sender *is*be unauthorized and prohibit*ed*. If you have received dis e-mail in error, please notify the sender by reply immediately. Any e-mail erroneously transmit*ted* to you should be immediately destroy*ed* |

*FIG. 13*

| Original Search Term | | | Original Search Term Recommendations | | Additional Search Terms | | |
|---|---|---|---|---|---|---|---|
| [X] lawyer | W/5 | [X] litigation | | | [X] lawyer | W/5 | [X] litigation |
| | | | [..] advocate | W/5 [X] action | [X] associate | W/5 | [X] litigation |
| | | | [X] associate | W/5 [X] case | [X] associate | W/5 | [X] action |
| | | | [..] Attorney | W/5 [..] cause | [X] associate | W/5 | [X] case |
| | | | [..] attorney-at-law | W/5 [..] contest | [X] associate | W/5 | [X] dispute |
| | | | [..] barrister | W/5 [X] dispute | [X] associate | W/5 | [X] hearing |
| | | | [..] barrister-at-law | W/5 [X] hearing | [X] associate | W/5 | [X] lawsuit |
| | | | [..] counsel | W/5 [..] judicial contest | [X] associate | W/5 | [X] legal action |
| | | | [..] counselor | W/5 [X] lawsuit | [X] associate | W/5 | [X] legal dispute |
| | | | [..] counselor-at-law | W/5 [X] legal action | [X] associate | W/5 | [X] matter |
| | | | [..] Esquire | W/5 [X] legal dispute | [X] associate | W/5 | [X] proceeding |
| | | | [..] legal adviser | W/5 [..] legal matter | [X] associate | W/5 | [X] suit |
| | | | [..] legal consultant | W/5 [..] legal proceeding | [X] associate | W/5 | lawsuit |
| | | | [..] legal practitioner | W/5 [X] matter | [X] associate | W/5 | [X] trial |
| | | | [..] of counsel | W/5 [X] proceeding | [X] associate | W/5 | [X] appeal |
| | | | [..] partner | W/5 [X] suit | | | |
| | | | [..] practitioner | W/5 [X] lawsuit | | | |
| | | | [..] representative | W/5 [X] trial | | | |
| | | | [..] solicitor | W/5 [X] appeal | | | |

*FIG. 14*

Subject: Kyoto Protocol Presentation From: "john gore" Date: Wed.13 Oct 1999 09:06:00 -0400 To: "kenneth lay@enron"

The attachment to the below message from the law firm of Winthrop. Stimsom. Putnam &Roberts is a very well done summary of the Kyoto Protocol. I attended the American Society for Quality Energy and Environmental Division conference last week and was impressed by this presentation. Enron is mentioned significantly in this paper and since I was the only Enron employee in attendance I got a lot of questions from other conferees about who we are and what we do. Thank goodness I paid attention at the new hire orientation last I believe there are many others at Enron who would enjoy reading this and will let your office make that distribution. It looks best printed on a good color printer. -------- Forwarded by John Gore/ENRON_DEVELOPMENT on 10/13/99 12:56 PM -------- brittaink@winstim.com on 10/12/99 05:32:31 PM To: John Gore/ENRON_DEVELOPMENT@ENRON_DEVELOPMENT cc Subject: Presentation Dear Mr. Gore:

William Thomas asked that I send you a copy of his ASQ presentation. If you do not receive this, let me know. My direct dial is 202-775-9819. Thank you.

Kathleen Brittain Secretary to William Thomas (See attached file: #60220279 v5 - ASQ PRESENTATION.doc)

This message, together with any attachments, is intended only for the use of the individual or entity to which it is addressed and may contain information that is legally privileged, confidential and exempt from disclosure. If you are not the intended recipient, you are hereby notified that any dissemination, distribution, or copying of this message, or any attachment, is strictly prohibited. If you have received this message in error, please notify the original sender (or the WSPR Help Desk) immediately by telephone (212-858-1000) or by return E-mail and delete the message, along with any attachments, from your computer. Thank you.

60220279 v5 - ASQ PRESENTATION.doc

******** EDRM Enron Email Data Set has been produced in EML, PST and NSF format by ZL Technologies, Inc. This Data Set is licensed under a Creative Commons Attribution 3.0 United States License <http://creativecommons.org/licenses/by/ 3.0/usk . To provide attribution, please cite to "ZI Technologies, Inc. lhttp://www.zlti.com)." ************

ESI STICS — FERC Investigation

Batch: Demo No.:0005  Docs: 1,252

Tabs: Welcome | Site | Subscribers | Coding | Verified | Matters | Search Terms | Documents | Configuration | Download Reports | Active Searchers:(0) | Quarantined Docs. | Find E-Mails | Batches | Load Docs | Test Status | Entities | Review | Legends | Rejected ⊗ | Clients | Quarantined ⊘ | Configuration Analysis

Verified Legends  Total: 84  Sort by: [Keyword Frequency]  Search: [ ]

Font: [ ]  A A A

| No. | Keyword Count | Date | Verified legend | | Sel. |
|---|---|---|---|---|---|
| LV 1. | 18 | 2023-05-16 21:05 | ... message and the attachments are or may be an attorney-client or other privileged or protected communication. If you are not the intended recipient of this message, or authorized to receive it for the intended recipient... | ▶ ❓ ✖ | ○ |
| LV 2. | 15 | 2023-05-16 21:02 | This message is for the named person's use only. It may contain confidential, proprietary or legally privileged information. or copy any part of this message if you are not the intended ... CREDIT SUISSE GROUP and each of its ... | ▶ ❓ ✖ | ○ |
| LV 3. | 15 | 2023-05-16 21:07 | This message is for the named person's use only. It may contain confidential, proprietary or legally privileged information. or copy any part of this message if you are not the intended ... ENDESA and each of its subsidiaries ... | ▶ ❓ ✖ | ○ |
| LV 4. | 15 | 2023-05-16 21:05 | This message is for the named person's use only. It may contain confidential, proprietary or legally privileged information. or copy any part of this message ... ENDESA and each of its subsidiaries ... the individual sender ... | ▶ ❓ ✖ | ○ |
| LV 5. | 14 | 2023-05-16 21:07 | The information contained in this e-mail message is intended only for the personal and confidential use of the recipient(s) named above. This message may be an attorney-client communication ... received this document in error | ▶ ❓ ✖ | ○ |

*FIG. 16B*

ESI STICS    FERC Investigation    Batch: Demo No.:0005 Docs: 1,252

| Welcome | Site | Subscribers | Clients | Matters | Selected Matter | Active Searchers (0) | Quarantined Docs. | Batches |
| Status | Entities | Coding | Legends | Search Terms | Documents | Download Reports | Find E-Mails | Load Docs |
| Statistics | Review | Verified ⊘ | Rejected ⊗ | Quarantined ⊘ | | Configuration | Configuration Analysis | Test |

Rejected Legends    ⊞ Total: 1  Sort by: Keyword Frequency  Search: [         ] ⊗

⊞ Font: [    ]   Ⓐ Ⓐ Ⓐ  Rejected legend

| No. | Keyword Count | Date | | Sel. |
|---|---|---|---|---|
| LR 1. | 5. | 2023 05-16 2:12 | Notwithstanding our general policy to provide employees with access to their Employment and Benefit Files, we may, decide not to provide access to information that contains references to other individuals, information that cannot be disclosed for legal, security, or commercial proprietary reasons, and information that is subject to an attorneyclient or other privilege. | ▶ ❓ ✖  ○ |

ESI STICS    FERC Investigation    Batch: Demo No.:0005 Docs: 1,252

Tabs: Welcome | Site | Subscribers | Entities | Clients | Matters | Selected Matter | Active Searchers (0) | Quarantined Docs. | Batches Status | Review | Coding | Legends | Search Terms | Documents | Download Reports | Find E-Mails | Load Docs Statistics | Verified | Rejected | Quarantined | Configuration | Configuration Analysis | Test

Quarantined Legends

Font:    Total: 1    Sort by: (Keyword Frequency)    Search:

| No. | Keyword Count | Date | Quarantined legend | Sel. |
|---|---|---|---|---|
| LQ 1. | 5. | 2023 05-16 21:07 | Michelle: Lynn would like to get the discovery responses back before taking the Plaintiffs deposition. Have you had a chance to review the latest draft of the discovery requests? If they meet with your approval, we will send the requests out today. We will start attempting to find a workable date for the deposition. Will you be attending? If so. please let me know what dates will work for you and then we will attempt to find an agreeable date with Plaintiff and his attorney. Christine Neely, Secretary to Lynn Paul Mattson and Kristen L Brightmire Doerner, Saunders, Daniel &Anderson, L.L.P. Information in this message may be privileged or confidential. Information is intended for the sole use of the addressee. No consent is given for unauthorized viewing or distribution. | ○ |

FIG. 17A

| Group 2 | 14 | 7 | | Term: privilege > Variant: *Privileged* Select All in Group |
|---|---|---|---|---|
| R 9.0 ❶ | 2 | 4 | msg | ansfer offer was not legitimate and constituted a constructive layoff/discharge. Privileged and Confidential Attorney/Client Communication PAGE 2 ——— |
| R10.0 ❶ | 2 | 1 | msg | the consolidation of Thruway's 1 Marty Blick Michelle Cash, Esq. Copy To: Privileged and Confidential Attorney/Client Communication PITNEY, HARDIN, KIPP 8 SZUCH LLP |
| R11.0 ❶ | 2 | 1 | msg | waived, may be brought up as a mid-term contract subject for bargaining. 2 Privileged and Confidential Attorney/Client Communication Jacobs Manufacturing Co., 28 LRR |
| R12.0 ❶ | 2 | 1 | msg | xercise of Section 10 of the CBA provides that all layoffs shall be in reverse 3 Privileged and Confidential Attorney/Client Communication 1 In addition, a busy train line |
| R13.0 ❶ | 2 | 1 | msg | the closure of the Thruway facility. We recommend that the Company present the 4 Privileged and Confidential Attorney/Client Communication 3 Thus, despite references |
| R14.0 ❶ | 2 | 1 | msg | does not justify the commute to Paterson, particularly if they lack personal 5 Privileged and Confidential Attorney/Client Communication layoff, whichever is later.* tra |
| R15.0 ❶ | 2 | 1 | msg | Older Workers Benefit Protection Act and local state law, please contact me. 6 Privileged and Confidential Attorney/Client Communication 4 For example, this firm is repr |
| Group 3 | 11 | 11 | | Term: privilege > Variant: *Privileged* Select All in Group |

ESI STICS  FERC Investigation                Batch: Demo No.:0005  Docs: 1,252

| Welcome | Site | Subscribers | Clients | Matters | Selected Matter | Active Searchers (0) | Quarantined Docs. | Batches | Batch |
|---|---|---|---|---|---|---|---|---|---|
| Status | Entities | Coding | Legends | Search Terms | Documents | Download Reports | Find E-mails | Load Docs | DAT File | Cls. | Metadata | Issues | Words | Bulk Updates |
| Launchpad | Find Text | Sampling | Review |

| Content | Metadata | Issues | Group Documents (3) | Suppress |

Show documents:  All    Matching    Sharing Result

| Document Details | STRs | Sel. STR | Type | Subject: |
|---|---|---|---|---|
| DOC-000016741 | 1 | X | P | livingston county proposed conditions to special use |
| DOC-000016748 | 1 | X | N | livingston county proposed conditions to special use |
| DOC-000016877 | 1 | X | N | livingston county proposed conditions to special use |

*FIG. 19B*

METHOD FOR FILTERING SEARCH RESULTS BASED ON SEARCH TERMS IN CONTEXT

CROSS-REFERENCE TO RELATED APPLICATION

This application is a national stage application under 35 U.S.C. 371 of International Application No. PCT/US2023/024931, filed Jun. 9, 2023, and claims the benefit of U.S. Provisional Patent Application No. 63/352,733, filed Jun. 16, 2022, the contents of each of which are incorporated by reference herein in their entirety.

FIELD OF THE INVENTION

The invention is related to a search platform, such as a document review platform, in which a plurality of documents may be reviewed to determine if individual documents are relevant to a search query.

BACKGROUND

The Growth of Electronically Stored Information

The exponential growth in the volume of Electronically Stored Information presents a formidable challenge to Proceeding Participants. In particular, the costs associated with Document Review are already significant and can only climb higher as the volume of Electronically Stored Information continues its inexorable rise.

A study published by the RAND Corporation in 2012 revealed that on average 73% of Document Production costs was attributable to Document Review-a process requiring an average of 23 attorneys that can take weeks, months or even years (in the case of rolling Document Productions) to complete.

Document Review Types

There are three types of Document Review:

Responsive Review

There are two sub-types of Responsive Review:

First Level Responsive Review

The objective of First Level Responsive Review is to separate Responsive Documents from Non-Responsive Documents.

First Level Responsive Review is typically conducted by paralegals, contract attorneys, and/or junior associates.

Failure to conduct First Level Responsive Review properly will increase the volume of Documents requiring Second Level Responsive Review (resulting in increased costs). There is also an increased risk that embarrassing Non-Responsive Documents will be disclosed.

Second Level Responsive Review

The objective of Second Level Responsive Review is to perform a quality control check of the Responsive Documents and Non-Responsive Documents identified during the First Level Responsive Review.

Second Level Responsive Review (which is often repeated multiple times) is typically conducted by senior associates.

Failure to conduct Second Level Responsive Review increases risk that embarrassing Non-Responsive Documents will be disclosed.

Privilege Review

Privilege Review involves identifying and extracting Privileged Documents from the corpus of Responsive Documents so they can be redacted (in whole or in part) and included in the privilege log.

Like Second Level Responsive Review, Privilege Review is often repeated multiple times in large part because previously unknown attorneys/law firms often come to light as Document Review progresses.

Privilege Review is typically conducted by senior associates and is the most time consuming and expensive part of Document Review.

Failure to conduct Privilege Review properly will inevitably result in serious consequences and may result in a finding that privilege has been waived.

Confidential Review

Confidential Review involves identifying and extracting Confidential Documents from the corpus of Responsive Documents so they can be redacted (in whole or in part) or designated as "Attorney Eyes Only." Like Second Level Responsive Review, Confidential Review is often repeated multiple times. Confidential Documents may include, for example, Personally Identifiable Information or other personal data, as well as commercially sensitive information or trade secrets.

Confidential Review is typically conducted by senior associates and is just as expensive and time consuming as Privilege Review.

Failure to conduct Confidential Review properly also has serious consequences and may result in contractual liability, court sanctions and regulatory financial penalties.

Identifying Review Documents

Existing Review Platforms make use of the following functionality to identify Documents:

Search Terms; and

Technology-Assisted Review, also occasionally referred to as Artificial Intelligence or Predictive Coding based review.

Search Terms

There are three types of Search Terms:

Responsive Search Terms

Responsive Search Terms are Proceeding specific and are designed to identify Responsive Documents.

Responsive Search Terms are developed collaboratively by attorneys and their clients and may also involve input from third parties.

Privilege Search Terms

There are two sub-types of Privilege Search Terms each of which are designed to identify Privileged Documents:

General Privilege Search Terms

General Privilege Search Terms are created by attorneys and law firms and evolve over a period of time based on experience obtained in prior Proceedings.

Attorney Privilege Search Terms

Attorney Privilege Search Terms are specific to the Proceedings and are designed to identify (via individual name, firm name, internet domain and/or email address) the authors/recipients of Privileged Documents (i.e. outside and in-house counsel).

Confidentiality Search Terms

Confidentiality Search Terms are typically Proceeding/Individual specific and are designed to identify Confidential Documents.

Confidentiality Search Terms may originate as a result of legislation (such as, e.g., the California Consumer Privacy Act, General Data Protection Regulation, Health Insurance Portability and Accountability Act, etc.) and/or as a result of collaboration between law firms and their clients.

It is important to note, however, that search terms in isolation will reveal little (if anything) about a document's categorization as a true positive document or false positive document as they provide insufficient textual context to make such a determination.

Technology-Assisted Review

Technology-Assisted Review is also used to identify Responsive Documents although its use is not as prevalent as Search Terms.

Currently, there is a reluctance of the part of Proceeding Participants to rely on Technology-Assisted Review to identify Privileged Documents and Confidential Documents due to the unique characteristics of each type of Document. For example, an attachment to an email exchanged between two non-attorneys will not be a Privileged Document and yet the same attachment sent to a law firm requesting legal advice on its content will be a Privileged Document.

Measuring Document Review Effectiveness

Document Review effectiveness is measured by Precision (a measure of completeness) and Recall (a measure of efficiency).

It is important to note that Recall and Precision have an inverse relationship so that improving one tends to degrade the other.

Conducting a high Recall/low Precision Document Review is extremely expensive because of the additional time required to identify, classify and categorize the high number of False Positive Documents.

Conducting a low Recall/high Precision Document Review is less expensive but raises the specter of important Documents being excluded from the Proceedings (in the case of Responsive Documents) or inadvertently disclosed (in the case of Confidential Documents and Privileged Documents).

For the reasons outlined above, Proceeding Participants have attempted to strike a difficult balance between Recall and Precision.

SUMMARY

A computer-based method is provided for filtering search results. The method includes first identifying a plurality of documents for review and then identifying an initial plurality of search term results potentially relevant to a search query, each search term result of the initial plurality containing an occurrence of a primary search term of a plurality of primary search terms. Each search term result of the plurality of search term results is drawn from one of the plurality of documents for review, and each search term result of the plurality of search term results is smaller than the one of the plurality of documents from which it is drawn.

The method then proceeds to group search term results of the initial plurality of search term results that are identical to each other to define a plurality of groups of search term results. A first group of search term results of the plurality of groups of search term results comprises search term results different than those of a second group of search term results of the plurality of groups of search term results.

The method then proceeds to display a representative search term result of the first group of search term results for evaluation.

Upon receiving an indication from a user that the representative search term result is to be removed, the method then removes all search term results of the first group from the initial plurality of search term results to define a modified plurality of search term results.

The method then defines each document from which any search result of the modified plurality of search term results is drawn as a potentially relevant document.

In some embodiments, each search term result of the plurality of search term results is larger than the search term, such that search term results are defined as identical only if contents of the search term results other than the search term are identical.

In some such embodiments, each search term result is either a sentence containing the corresponding search term or is the corresponding search term combined with a previously defined number of leading or following characters.

Alternatively, in some such embodiments, upon receiving an indication from the user that the representative search term result is ambiguous, the method displays a document component containing the search term result to the user. The component is larger than the corresponding search term result but smaller than the document from which the search term result is drawn. Upon receiving a further indication from the user that the snippet is to be removed, the method proceeds with removing the corresponding representative search term result from the at least one group of search term results and defining a different search term result from the group of search term results as the representative search term result for display to the user.

In some embodiments, multiple search term results are drawn from a single document of the plurality of documents for review, such that the document is defined as potentially relevant to the search query so long as any single search term result associated with the corresponding document remains in the modified plurality of search term results.

In some embodiments, the method further includes displaying a representative search term result for each group of the plurality of groups of search term results and receiving an indication from the user that the corresponding representative search term result is relevant to the search query or that the corresponding representative search term result is to be removed.

In some embodiments, the method further includes displaying a representative search term result for each group of the plurality of groups of search term results and receiving an indication from the user that the corresponding representative search term result is relevant to the search query, that the corresponding representative search term result is to be removed, or that the user cannot make a determination based on the representative search term result.

In some embodiments, the method further comprises identifying at least one form paragraph prior to identifying the initial plurality of search term results and defining a search term result as part of the initial plurality of search term results only upon determining that the corresponding search term result is not drawn from the at least one form paragraph.

In some embodiments, the method further comprises identifying at least one form paragraph prior to identifying the initial plurality of search term results and preemptively indicating to a user that a particular representative search term result presented for evaluation is drawn from the at least one form paragraph.

In some embodiments, the method further comprises displaying each potentially relevant document to the user for further review and receiving an indication from the user that the corresponding document is either relevant or irrelevant.

In some embodiments, upon defining a group of potentially relevant documents, the method comprises identifying at least one document of the group of potentially relevant documents as containing a secondary search term, and retaining the at least one document for further review.

In some such embodiments, the further review identifies the document as at least partially privileged or confidential and implements a redaction process.

In some embodiments in which secondary search terms are identified, such secondary search terms comprise names or contact information extracted from the plurality of documents for review.

In some such embodiments, the method includes extracting the names or contact information from header information of the plurality of documents for review. For each name extracted, the method then retrieves secondary information from a data source external to the plurality of documents. The method then determines, based on the secondary information, whether to include the corresponding name or contact information as a secondary search term.

In some such embodiments, the data source external to the plurality of documents is the internet or an external database.

In some embodiments in which names or contact information are extracted. Such names or contact information are extracted from a load file accompanying batches of documents or the names or contact information are extracted from body text using Regular Expressions, Email Parsing Libraries, Natural Language Processing (NLP), Machine Learning, or third-party APIs.

In some embodiments in which names or contact information are extracted, the method includes extracting names or contact information from email header information of the plurality of documents for review. The method then generates a map illustrating communications between parties associated with each name or contact information extracted, the map based on indications that emails were transmitted between those parties or that those parties were copied on the same communications. The method then displays the map to the user and receiving an indication from the user that at least one name or contact information visualized in the map should be included as a secondary search term.

In some embodiments, the method further includes processing the documents of the plurality of documents for review prior to identifying the initial plurality of search term results. Processing includes lemmatization of the corresponding documents, and at least one primary search term is a lemma.

In some embodiments, the method further includes processing the documents of the plurality of documents for review prior to identifying the initial plurality of search term results, wherein processing includes normalization, sentence tokenization, or removal of stop words.

In some embodiments, each primary search term of the plurality of primary search terms is one of a single word, a continuous series of words, or a plurality of words located within a threshold number of words of each other.

In some embodiments, the method includes the generation of additional search term results from the initial plurality of search term results via human or artificial intelligence supplementation.

In some embodiments, the identification of the initial plurality of search term results potentially responsive to the search query is based on a Boolean comparison of each of the plurality of primary search terms to each of the plurality of documents.

BRIEF DESCRIPTION OF THE DRAWINGS

FIGS. 1A and 1B schematically illustrates an exemplary review process in accordance with this disclosure compared with a traditional review process.

FIGS. 3A-3C illustrate an exemplary document processed in accordance with the exemplary method of FIG. 2.

FIGS. 4A and 4B illustrate individual search term results in accordance with the exemplary method of FIG. 2.

FIG. 5 illustrates the classification of groups of documents based on exemplary search term results in the context of the exemplary method of FIG. 2.

FIGS. 6A-6B illustrate the presentation of a document component, occasionally referred to herein as a "snippet," to a user in the context of the exemplary method of FIG. 2. Such a document component may comprise all or part of a document unit, such as a text string, sentence, paragraph, table, or table cell. Other document parsing schemas are possible as well.

FIGS. 7A-7B illustrate the presentation of a full document to a user in the context of the exemplary method of FIG. 2.

FIG. 8 illustrates the extraction of email addresses from the body of a document in accordance with this disclosure.

FIG. 9 illustrates the identification of domains associated with email addresses extracted in FIG. 8.

FIG. 10 illustrates the presentation of domains identified in FIG. 9 to a user.

FIG. 11 illustrates the population of the presentation of FIG. 10 with additional context.

FIG. 13 illustrates lemmatization of document text in accordance with this disclosure.

FIG. 14 illustrates the expansion of search terms for use in generating search results in accordance with this disclosure.

FIG. 15 illustrates an email legend to be excluded from or automatically classified within search results in accordance with this disclosure. Such an email legend may correspond to a footer containing boilerplate language, for example.

Figure 16A:
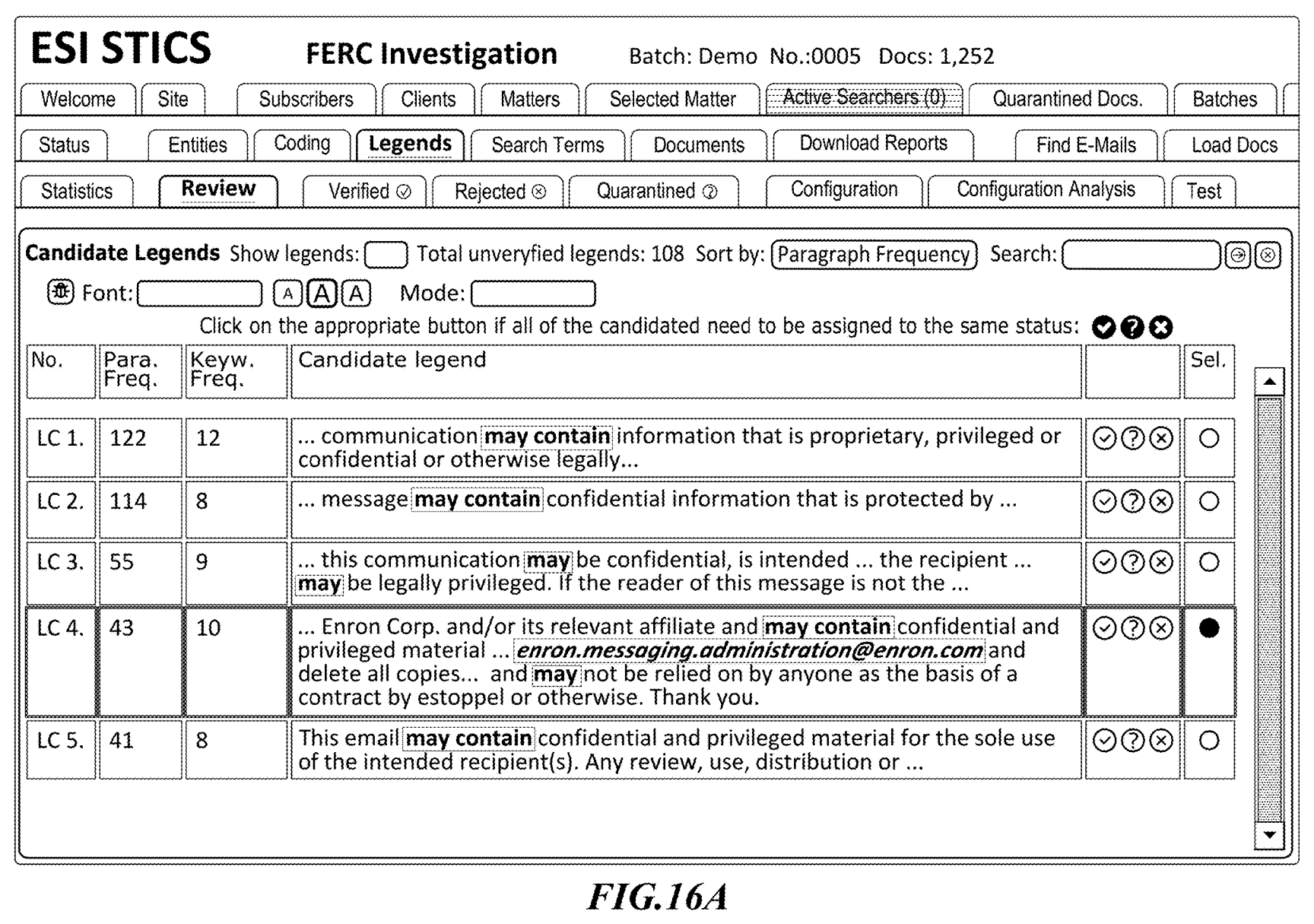

FIGS. 16A-D illustrate a process for classifying email legends in accordance with this disclosure.

FIGS. 17A-17B illustrate the automatic classification of search term results originating from legends in accordance with this disclosure.

FIGS. 18A-18B illustrate an interface for bulk classification of documents in accordance with this disclosure.

FIGS. 19A-19B illustrate the grouping and categorization of search results by subject matter in accordance with this disclosure.

DETAILED DESCRIPTION OF THE PREFERRED EMBODIMENTS

Figure 2:
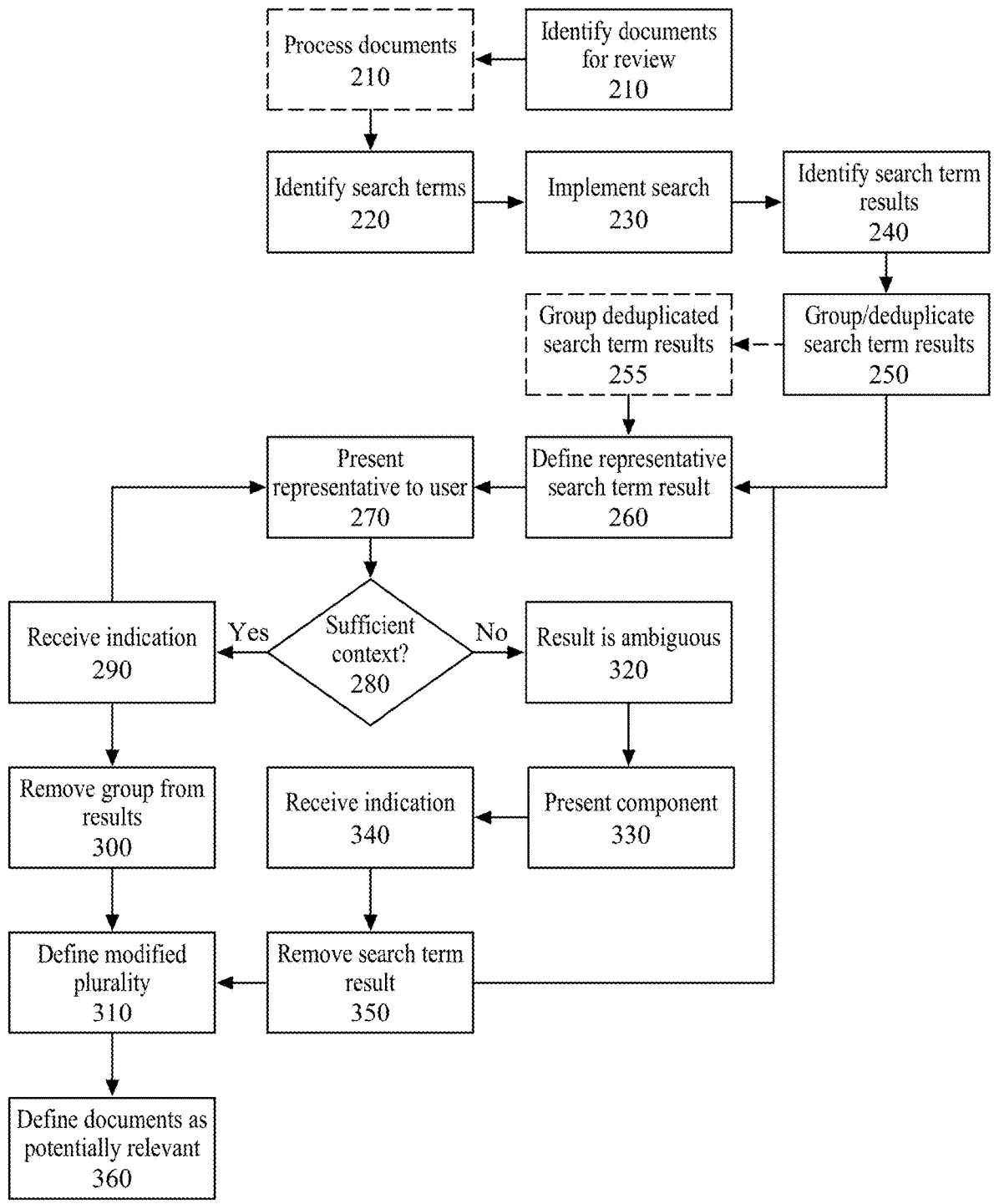
FIG. 2 is a flowchart illustrating an exemplary computer-based method of filtering search results in accordance with this disclosure.

The description of illustrative embodiments according to principles of the present invention is intended to be read in connection with the accompanying drawings, which are to be considered part of the entire written description.

The features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

A system and method described herein allow a user to quickly and efficiently filter search results and/or documents by viewing grouped search results in context. As discussed in more detail below, such grouping may follow a deduplication process, such that the grouped search results have already been deduplicated. By grouping search results in situations where context is related or identical, users may be able to quickly eliminate false positives from bulk search results, thereby drastically reducing the number of documents from which those search results are drawn that require more comprehensive or fully manual review.

The system and method are described herein in the context of document review processes, such as legal reviews in in preparation for litigation. In the context of such document review, documents are generally reviewed for several distinct reasons. These reviews typically include a review for responsiveness, privileged information, and confidential information.

In the context of a responsiveness review, bulk documents are reviewed to determine if they are substantively responsive to a requirement, and therefore should be included in a set of results. For example, when responding to a discovery request, the responsiveness review would identify all documents that should be disclosed in response, barring any privileged or confidential information that would prevent such disclosure.

Accordingly, a search might initially be overbroad, and a comprehensive review of those search results would typically be implemented to eliminate false positives. In the context of responsiveness review, a "false positive" would therefore be a document that should not be disclosed.

In the context of a privilege or confidentiality review, bulk documents are reviewed to determine if any documents that are substantively responsive should, nevertheless, be withheld or redacted due to some basis for privilege or confidentiality. This might be, for example, due to a particular document being a privileged communication between an attorney and a client.

Accordingly, a search to identify such privileged or confidential information might be overbroad, and a review of such results would eliminate false positives. However, in the context of these reviews, a "false positive" would be a document that should be disclosed, while true positives would be withheld or redacted.

It is noted that while this discussion is presented in the context of document review, such as in preparation for litigation, a similar method of filtering search results may be utilized in other contexts as well (e.g., privacy review). Such a method may then be used to increase a precision level, speed, or efficiency, of partially automated searching more generally.

FIGS. 1A and 1B schematically illustrate an exemplary review process in accordance with this disclosure compared with a traditional review process, such as the Electronic Discovery Reference Model (EDRM). As shown in FIG. 1A, in implementing a traditional electronic document review process, an initial search may identify a plurality of documents for review using some automated search process, and may then simply present those documents to attorneys for review. As such, all documents are reviewed in a linear fashion in their entirety to determine whether such a document is responsive and, if so, if the document is privileged or contains confidential information and therefore should be withheld or requires redaction.

In contrast, as shown in FIG. 1B, in the method disclosed herein, instead of searching for responsive documents, an initial search instead identifies potentially relevant fragments of documents, referred to herein as "search term results" made up of search results including a search term. Once a plurality of search term results is identified in an initial search, such fragments may be presented to a user. Where those fragments contain sufficient information to make a determination with respect to a particular review, the user can then make their determination on the basis of just the search term results. Accordingly, in a typical implementation, the process may be 80% fragment based and 20% full document based.

Further, because documents are presented based on fragments, the fragments may be deduplicated, where they are identical, and/or grouped where they are similar. Accordingly, where multiple documents contain the same potentially relevant search terms with the same immediate context, an initial search may identify all instances of the potentially relevant term and the method may then group the corresponding search term results. A user may make a determination with respect to all such grouped identical search term results simultaneously.

Accordingly, as shown in the fragment-based portion of the review, processes may be automated or semi-automatic. Accordingly, a legend review may identify boilerplate text in order to support a review for privilege or otherwise exclude the legend from any substantive evaluation of the corresponding document. As discussed in more detail below, this may be by identifying keywords typically associated with privilege (such as terms explicitly indicating that a document may be privileged), and determining if those keywords appeared only in boilerplate text. In such a scenario, the keyword may not actually indicate anything with respect to the substance of the corresponding document. For example, an attorney email may include a signature block having a legend indicating possibly privileged content which does not bear on whether any particular email is privileged.

Further, search term results and documents as a whole may be handled in bulk based on the fragments including the identified search terms. This is discussed in more detail below in reference to the method disclosed.

Figure 3C:
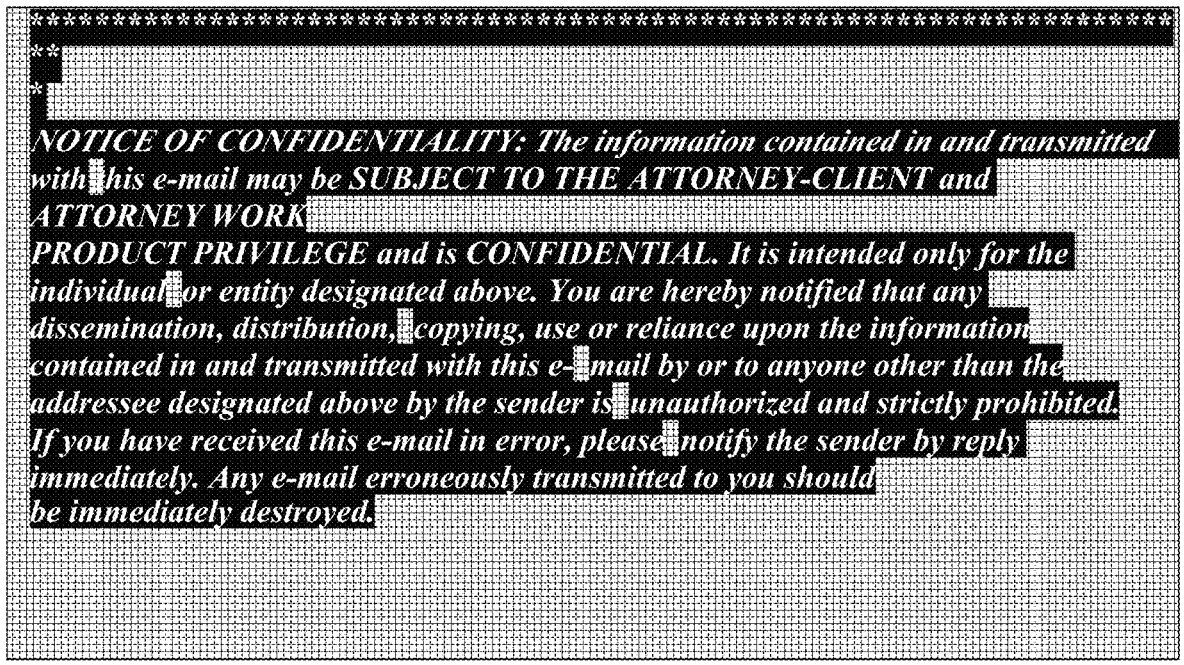

FIG. 2 is a flowchart illustrating an exemplary computer-based method of filtering search results in accordance with this disclosure. Further, FIGS. 3A-3C illustrate an exemplary document processed in accordance with the exemplary method of FIG. 2. The document presented in FIGS. 3A-3C may inform the portions of a document referred to using specific terms, and will therefore be referenced throughout the discussion of the method.

Initially, a plurality of documents is identified (200) for review. This may be by loading a database or receiving a batch of documents for review. In some cases, such a batch of documents may be accompanied by a file manifest, or a load file, containing extracted metadata. Alternatively, the plurality of documents may be initially created or compiled by scraping underlying sources of documents, such as email accounts, or by receiving access to files. Further, the documents may be retrieved from hard copies, and as such may be the result of a scanning process.

It is assumed generally that the plurality of documents is in a condition that allows for automated review. As such, the plurality of documents are typically text documents or contain a text layer that can be processed. Alternatively, if documents are initially provided as image files, text may be extracted using, for example, an optical character recognition (OCR) process. Similarly, the documents may contain features in order to ease the ability of an automated system to process the documents further. For example, the documents may contain tags created in a markup language, such as HTML or XML, or the documents may be provided as standard format email files.

In some embodiments, the plurality of documents may be processed (210) prior to executing any search operation. This may include, for example, text normalization (such as, e.g., lower or upper case transformations), sentence tokenization, removal of stop words, punctuation, numbers, emojis, or other elements, lemmatization of terms, or other processing steps, discussed in more detail below with respect to FIG. 13.

The method then proceeds to identify search terms (220) for use in the search process. The search terms used for the search may vary based on the type of search to be performed. As such, a search for documents responsive to a discovery request may include substantive terms identified by the parties involved in a legal conflict for review. Alternatively, or in addition, an automated or semi-automated process may be implemented to identify additional appropriate terms (e.g. via the use of synonyms). Such a list of additional appropriate terms may be generated by human and/or artificial intelligence).

Alternatively, a search for documents that are believed to be privileged may rely on a different set of search terms. Search terms related to responsiveness may be substantive, while search terms related to privilege may instead relate to names of individuals, such as attorneys, as well as law firms, each of which may be likely to have privileged discussions.

The search terms used may take different forms, and may include, for example, individual phrases, terms within a range of each other, stemmed terms, terms including wildcards, and Boolean operators, among others.

Once search terms are selected, the method implements a search (230) based on those search terms. As a result of the implemented search, the method identifies (240) an initial plurality of search term results potentially relevant to a search query. Each search term result included in the initial plurality of search term results contains an occurrence of a search term included in a plurality of search terms included in the search. The initial plurality of search term results may be used to generate additional search term results via human or artificial intelligence supplementation (e.g., unsupervised machine learning algorithms, such as transformers, text embedding, such as vector representations, and other similarity based methods).

The search query discussed herein is the objective of the particular search being implemented. As such, in the context of a responsiveness search, the search query is to generally identify documents responsive to a discovery request. Similarly, for a privilege review, the search query would instead be to determine whether a document is privileged.

Accordingly, the identification of search term results potentially relevant to the search query (at 240) is typically based on whether the search term result contains an occurrence of a search term of the plurality. It is noted that in some embodiments, the search methodology may be implemented repeatedly. For example, a first search may be implemented for a responsiveness review while a second search may be applied to the batch of documents or only to documents determined to be responsive to determine if any such responsive documents are privileged. In some embodiments, a search may precede the responsiveness search as well, such as in order to identify legends to exclude from later search results. In discussing such results, search terms associated with a first search pass may be referred to as primary search terms while search terms associated with a second search pass may be referred to as secondary search terms. It will be understood that the classification of "primary" and "secondary" are for the purpose of distinguishing sets of search terms, and do not necessarily indicate timing or importance of the searches relative to each other.

Each search term result contains an occurrence of a search term and typically contains context associated with the search term. As shown in FIGS. 3A-3C, the search term result may then include the search term (which may be either a single word or phrase or a grouping of words or phrases within a range) as well as search term context surrounding the search term. Each such search term result is drawn from one of the plurality of documents for review, and is a fragment of the document from which it is drawn.

Typically, because the search term result includes context, it would be longer than the search term contained therein. Such a search term result may then be, for example, a sentence containing the corresponding search term. Alternatively, the search term result may be a corresponding search term combined with a previously defined number of leading and/or following characters. For example, the search term result may be the search term combined with 80 preceding and 80 following characters.

The method then proceeds to group search term results (250) of the initial plurality of search term results that are identical to each other. As such, a plurality of groups of search term results may then be defined, such that a first group of search term results comprises search term results different than those of a second group of search term results. All search term results of the first and second group are drawn from the initial plurality of search term results and as noted above, the search term results are typically larger than the underlying search term. Accordingly, search term results are defined as identical, and are thereby grouped, only if contents of the search term results other than the search term are identical.

Grouping in this manner may be referred to elsewhere herein as "deduplication." Because the search term results represent fragments of documents, rather than complete documents, the fragments may be duplicative where similar sentences appear across a large number of documents. If such a fragment does not indicate a positive search result, then any identical fragment would similarly not indicate a positive search term result. As such, by grouping, or deduplicating, such identical search term results, the results may be reviewed more efficiently.

In this implementation of the method, the grouping described (and provided in step 250) represents a deduplication step. However, as noted above, in other embodiments, deduplication and grouping may represent distinct steps. In such an embodiment, the search term results may first be deduplicated (at 250) followed by a second grouping step (at 255) where similar search term results that have already been deduplicated (at 250) may then be grouped.

Once grouped, representative search term result is typically defined for each group (260) such that the representative result can be presented to a user (at 270) for evaluation. The user may then review the representative search term result and determine (at 280) if the search term result, taken alone, provides sufficient context for the underlying search term to determine if the search term result is relevant to the search query.

If the user determines that the representative search term result provides sufficient context, they may then indicate that the representative search result is to be removed from the search results, or that it should be retained in the results. The user may indicate that the representative search term result is to be removed because, for example, it represents a false positive.

The method may then receive an indication (290) from the user that the representative search term result is to be removed or retained. In such a scenario, where the user indicates that the search term result is to be removed, the method then removes (300) all search term results of the corresponding group from the initial plurality of search term results to define a modified plurality of search term results (310). Alternatively, the method may instead receive an indication (at 290) from the user that representative search term result is to be retained, and in such a scenario, the corresponding group may continue to be present in the modified plurality of search term results.

Figure 4A:
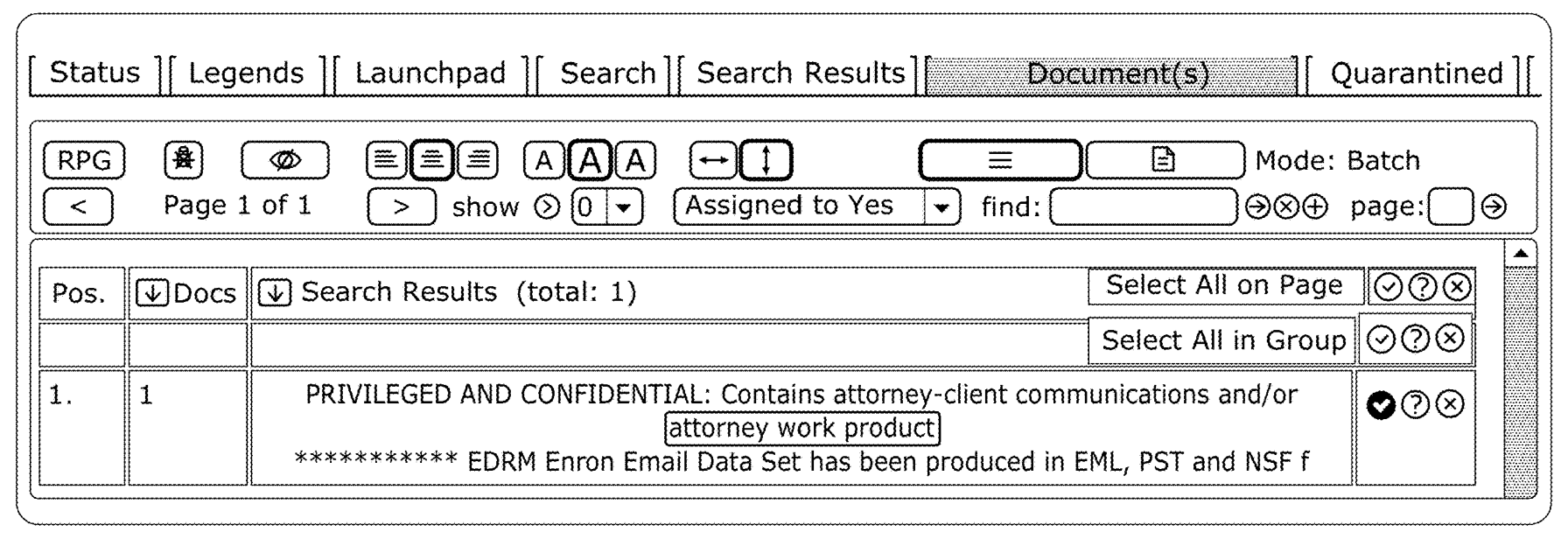
Figure 4B:
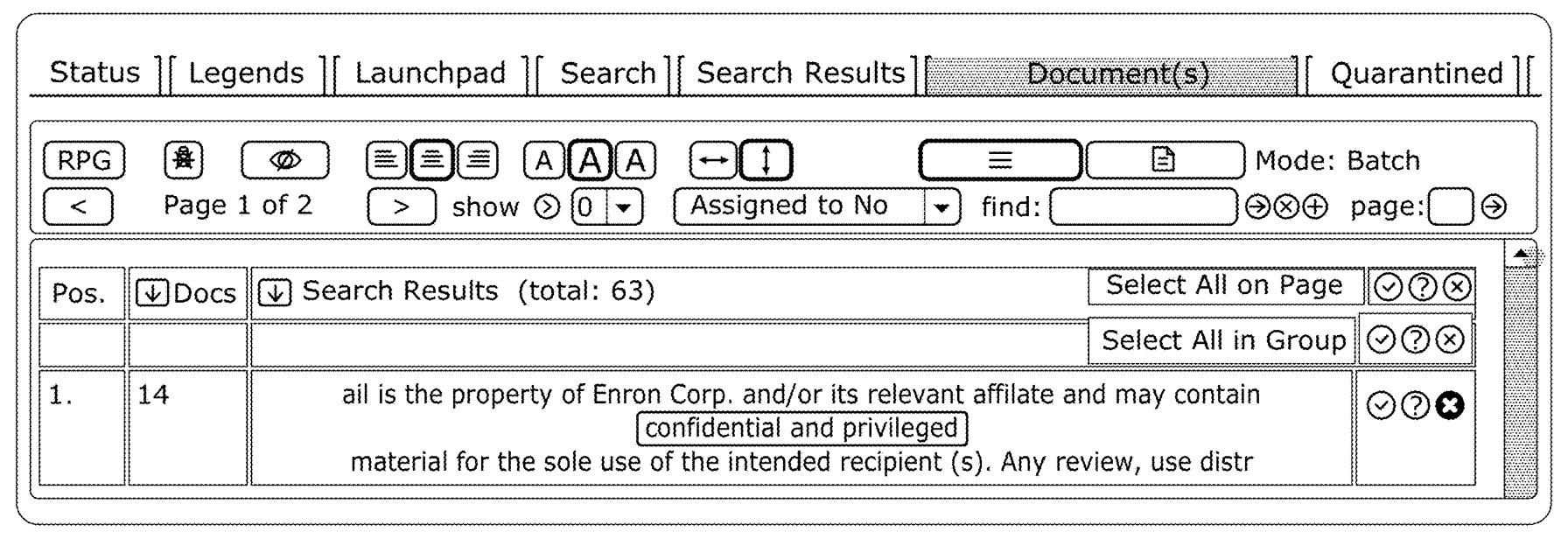

FIGS. 4A and 4B illustrate individual search term results in accordance with the exemplary method of FIG. 2. While the example relates to use in a privilege review, a similar approach is used in other types of reviews discussed herein. FIG. 4A shows an example of a term that was included in the plurality of search term results potentially relevant to a search query because it included the term "attorney work product," which implies that the document may be privileged. The search term result then includes the context, which appears to assert privilege. As such, a user may indicate that the result is a true positive result by, for example, ticking a box that indicates that the result should be "pinned" and thereby retained in the modified plurality of search results. Various interface implementations are contemplated, and in the illustrated embodiment, the user indicates a true positive respond by clicking a check icon indicating that the result should be retained in the modified plurality of search results.

In contrast, FIG. 4B shows an example of a term that was included in the plurality of search term results potentially relevant to a search query because it included the term "confidential and privilege." However, when viewing the search term results, it is clear that this language was part of boilerplate, such as a legend, and merely indicated that documents may contain privileged information. As such, this language alone does not indicate relevance to the search query, and the user may indicate that the representative search term result is therefore a false positive and can be removed by ticking the box corresponding to the trash icon, or selecting an "X" icon.

In order to enhance the contrast between the true positive search result in FIG. 4A and the false positive search result in FIG. 4B, the result in FIG. 4A may be shaded in, e.g., green, while the result in FIG. 4B may be shaded in, e.g., red.

As shown, the representative search term result shown in FIG. 4B was part of a group that included 14 identical search term results. Accordingly, upon receiving the indication from the user (at 290), the method removes all 14 results (at 300).

This process may then be repeated for each group of the plurality of groups until all groups have been evaluated. For any group for which the method receives an indication from a user that the representative search term result is to be removed, all search term results of the corresponding group are then removed. Accordingly, once the method receives the indication (at 290), a representative search term result of a different group may be presented to a user (at 270). In some embodiments, multiple such representative search term results are presented simultaneously, such that a user can continue down a list. This is shown in interface examples discussed in more detail below.

Figure 5:
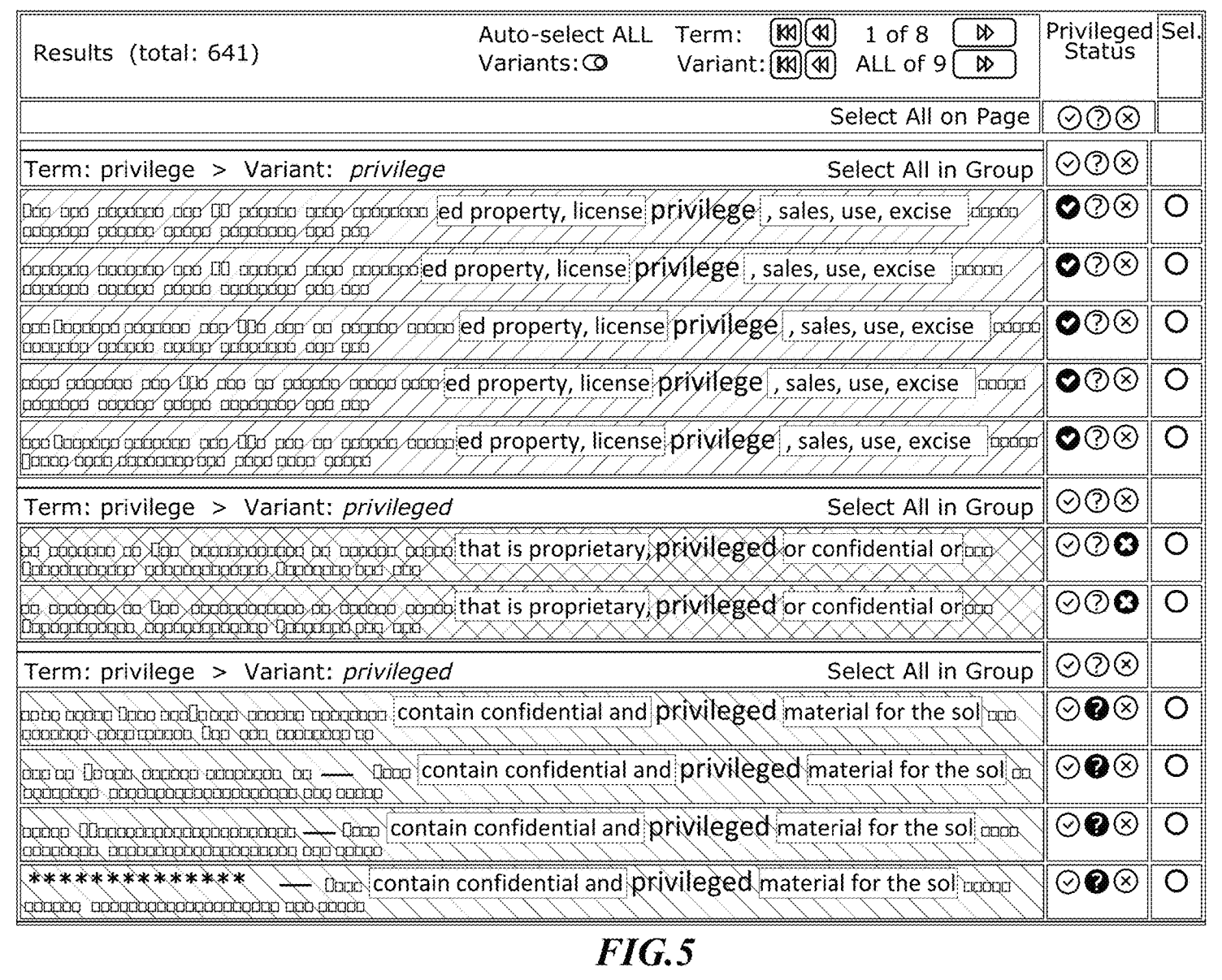

FIG. 5 illustrates the classification of groups of documents based on exemplary search term results in the context of the exemplary method of FIG. 2. As shown, several groups are presented, and for each group, the user can provide an indication that the representative search term should be removed or retained (at 290). The indication for each line item, or search result, may then be shown on the right, while the results themselves may be shaded in e.g., green, red, or a neutral color to further visually represent the result.

FIGS. 6A-6B illustrate the presentation of a document component, or snippet, to a user in the context of the exemplary method of FIG. 2. In some embodiments, the user may choose not to classify a representative search result, thereby leaving a box unchecked. Similarly, or alternatively, the user may choose to proactively indicate that a representative search result is ambiguous (320) and that further context is required in order to classify the document. In such a scenario, the method may then present (330) a document component containing the search term result to the user. The component is typically larger than the corresponding search term result, but smaller than the document from which the search term result is drawn. Such a component example is illustrated in FIGS. 3A-3C.

Upon receiving a further indication from the user that the component is to be removed from the search term results (340), the corresponding representative search term result is removed from the corresponding group of search term results (350). However, because additional context was required for the user to make the determination, the remaining search term results of the group remain in the modified plurality of search term results until they are separately evaluated.

Accordingly, a different representative search term result is typically defined for the corresponding group (at 260) such that the replacement representative result can be presented to a user (at 270) for evaluation and only the specific search term result removed (at 350) is removed from the modified plurality defined (at 310). The process then repeats until all such results are reviewed. Because the user had previously indicated that the search term result did not provide sufficient context, in some such scenarios, the user would continue to review all search term results of the corresponding group consecutively.

In some embodiments, where the larger component is identical across multiple search term results, such components may be presented to the user as a group for evaluation in a similar manner to the review of the search term results themselves.

FIGS. 7A-7B illustrate the presentation of a full document to a user in the context of the exemplary method of FIG. 2. If, after reviewing a component, the user still cannot make a determination with respect to the relevant search term result, the method may proceed to present the corresponding full document to the user for review. As in the case of the component review discussed above, if a user indicates that a full document is to be removed from the search results, such a decision would remove the corresponding search term result from a group, but would not impact a classification associated with the group as a whole.

In some embodiments, if the user cannot make a determination based on the component, the user may simply indicate that the document is ambiguous or otherwise quarantine the document rather than classifying it. In this way, any full document review can be deferred to later in the process.

After evaluating a number of groups of search term results, the method may then return to plurality of documents initially identified for review. As such, each search term result remaining in the modified plurality of search term results after such processing is traced back to the underlying document from which it was drawn. Each document from which any search result of the modified plurality of search results is drawn is defined (360) as a potentially relevant document.

In this way, the search term results may be initially reviewed independently outside of the larger context of the document from which it is drawn. If the search term results without any broader context are sufficient to determine that a particular result should not be included in the modified plurality of search results, it can thereby be removed.

Because search results are reviewed by users in the context of search term results, rather than as complete documents, multiple search term results may be drawn from a single document. As such, any single true positive search term result would be sufficient for inclusion of the corresponding document as a potentially relevant document, and any document is defined as potentially relevant to the search query so long as any single search term result associated with the corresponding document remains in the modified plurality of search term results. For example, if a document included three distinct sentences or clauses that appeared as search term results and one of them was indicated by the user for removal, the remaining two search term results drawn from that document would remain in the modified plurality of search term results, and may thereby lead to inclusion of the corresponding document as potentially relevant.

In some embodiments, the complete process is repeated in sequence for different types of searches, as noted above. Accordingly, once a set of documents are defined as potentially relevant, the method may utilize that as the identified plurality of documents for review (at 200) for a second search. For example, the first search may be for responsiveness while the second search may be for privilege.

FIG. 8 illustrates the extraction of email addresses from the body of a document in accordance with this disclosure. FIG. 9 illustrates the identification of domains associated with email addresses extracted in FIG. 8. FIG. 10 illustrates the presentation of domains identified in FIG. 9 to a user. FIG. 11 illustrates the population of the presentation of FIG. 10 with additional context.

In some embodiments, a privilege check is implemented independent of, or in addition to, a main search. In implementing such a privilege check the method may first implement a first pass of filtering the search results to identify a plurality of potentially relevant documents. The method may then proceed to search documents for secondary search terms. As discussed above, the secondary search terms may be different than the primary search terms, and in the example discussed herein, the secondary search terms may comprise names or contact information of relevant parties.

In such an embodiment, if documents are identified as containing a secondary search term, such a document may be retained for further review in order to determine if the document is privileged and therefore should not be disclosed. The further review may then identify a document that is at least partially privileged or confidential. In some embodiments, or in some scenarios, a document may then be removed from the defined set of potentially relevant documents. In other embodiments or scenarios, the method may proceed to implement a redaction process while retaining the corresponding document.

As noted above, in some scenarios, the secondary search terms comprise names or contact information. Such names or contact information may be extracted from the plurality of documents for review themselves. For example, the method may further comprise extracting the names or contact information from header or body information of the plurality of documents for review.

This may be, for example, by extracting email addresses from a load file accompanying a batch, or it may be by extracting email addresses from body text using, for example, Regular Expressions, Email Parsing Libraries, Natural Language Processing (NLP), Machine Learning, Third-party APIs, or other automated or semi-automated processes. An example of a regular expression designed to extract an email address is shown, for example, in FIG. 8.

As shown in FIG. 9, the method may then proceed to parse out a domain for each email address extracted from the load file and email body. The method may similarly extract names and roles of such relevant parties. FIGS. 10 and 11 then illustrate the use of the method to extract additional information related to the parties. Such information may be used by humans, rule-based algorithms, or artificial intelligence algorithms, among other methods, to determine if or confirm that the domain name corresponds to a law firm or any other party that may indicate or imply a privilege claim.

For each name extracted, the retrieval of secondary information may be from a data source external to the plurality of documents, and the secondary information may then be used to determine whether to include the corresponding name or contact information as a secondary search term. The external data source may be the internet or some other external source, such as, e.g., a database or directory of law firms.

Figure 12:
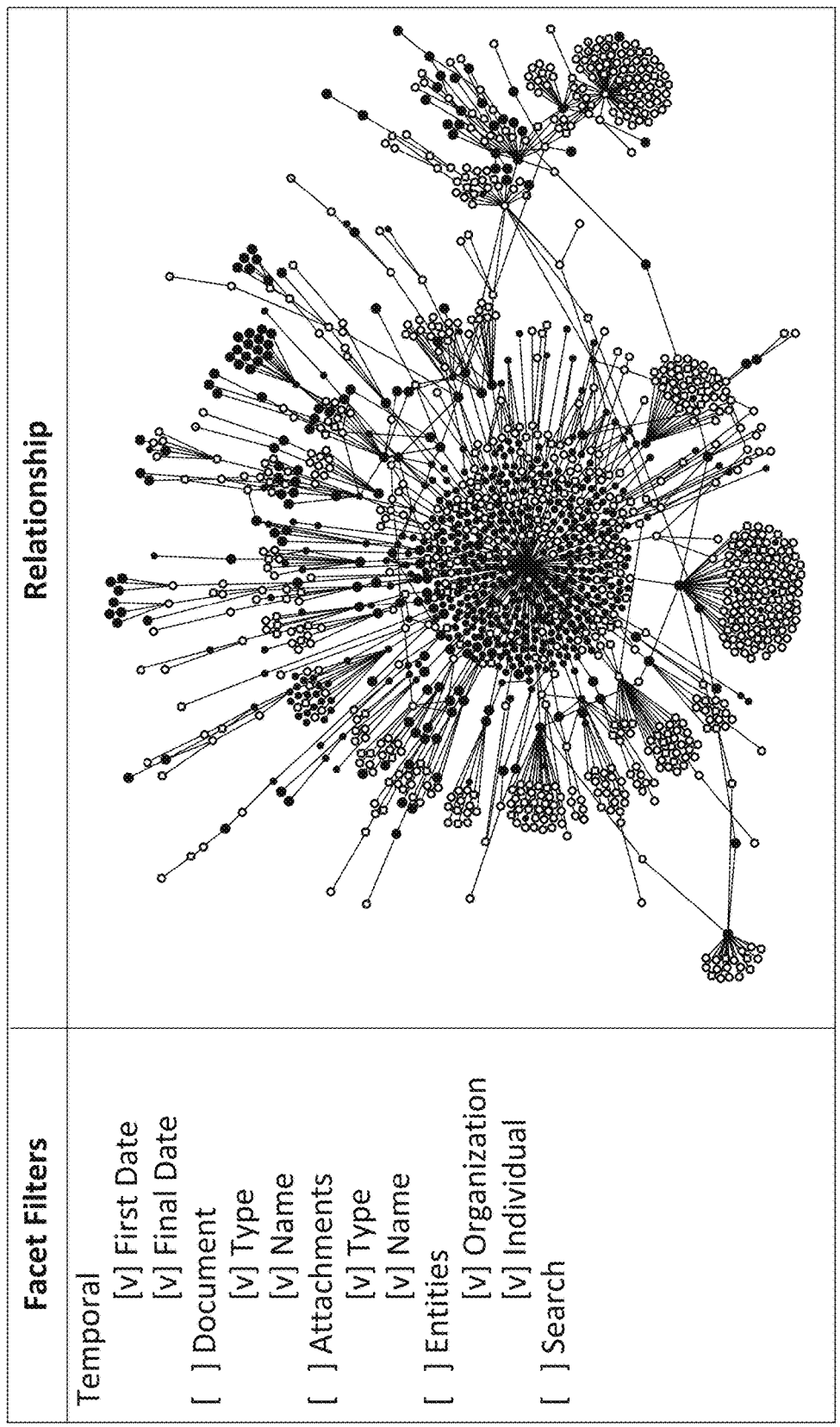
FIG. 12 illustrates a visualization of relationships in accordance with this disclosure.

FIG. 12 illustrates a visualization of relationships in accordance with this disclosure. In some embodiments, after extracting names or contact information from email header or body information of the plurality of documents for review, the method proceeds to generate a map illustrating communications between parties associated with each name or contact information extracted. Such a map may be based on relationships illustrated in email transmissions, such as email transmissions between parties or that certain parties are copied on the same communications.

This approach may illustrate relationships between individual people, parties, and entities, and may be based on temporal aspects (such as timing of communications) type and name of documents, type and name of attachments to the document, and entities involved. Upon displaying such a map to the user, the method may receive an indication from the user that at least one name or contact information visualized in the map should be included as a secondary search term.

In some embodiments, authors of privileged content may be further identified using existing named entity recognition engines, such as GPT, Bard, GATE, NLTK, and/or Spacy.

FIG. 13 illustrates lemmatization of document text in accordance with this disclosure. As discussed above, the plurality of documents may be processed (210) prior to executing any search operation. This may include, for example, normalization, sentence tokenization, removal of stop words/punctuation/numbers/emojis and others, lemmatization of terms, or other processing steps. In some embodiments, processing (210) may further include text embedding or transformers.

In the example shown in FIG. 13, a comparison is presented between stemming and lemmatizing a document. In some existing methodologies, certain words in documents are stemmed so that certain variations of the same word are identified as identical to a particular search term. However, such an approach ignores the morphological root of a word, and may therefore miss certain relevant variations of a term.

Instead, the method disclosed herein may lemmatize the plurality of documents prior to implementing the search (at 230). Lemmatization includes conversion of each word to its base, or dictionary form. The method pairs this with the modification of all search terms to lemmas. Such an approach considers context and increases accuracy of the search. As one example, when comparing the terms "studying" and "studies," a stemming approach may search for "study," thereby ignoring the similar term "studies." Alternatively, the stemmed term may be "stud," thereby including additional unrelated false positives. However, lemmatizing both terms would result in the term "study" appearing in both contexts.

FIG. 14 illustrates the expansion of search terms for use in generating search results in accordance with this disclosure. A search term to be included as part of a search may be, for example, a single word, a continuous series of words, or a plurality of words located within a threshold number of words of each other. In this context, the identification of the initial plurality of search term results potentially responsive to the search query may be based on a Boolean comparison of each of the plurality of primary search terms to each of the plurality of documents.

In some embodiments, after a user identifies a set of search terms, the method may suggest additional search terms or combinations for use in the search. As shown in FIG. 14, a user may then choose potential synonyms to include in such results.

FIG. 15 illustrates an email legend to be excluded from or automatically classified within search results in accordance with this disclosure. As discussed above, an email legend may be a form paragraph that contains keywords relevant to a search (such as, for example, the term "privileged"), but would not impact the classification of a particular document as privileged. This is because the legend is boilerplate text and is therefore not relevant to the content of the document itself.

Accordingly, in some embodiments, the method further comprises identifying at least one form paragraph prior to identifying the initial plurality of search results. In some such embodiments, the method then defines a search term result as part of the initial plurality of search term results only upon determining that the corresponding search term result is not drawn from the at least one form paragraph. In this way, the form paragraph would not trigger the inclusion of a document in the search term results, and such language would not lead to review.

In alternative implementations, after the method identifies at least one form paragraph, the method reviews the initial plurality of search term results prior to displaying the representative search term results to the user. Where the method determines that any particular group was drawn from an identified form paragraph, the method may then preemptively mark the corresponding group as slated for removal. Accordingly, a user may modify the indication, but would not be required to proactively further indicate that a particular representative search term result is to be removed.

FIGS. 16A-D illustrate a process for classifying email legends in accordance with this disclosure. Such a classification process may be similar to the main method described above for classifying search term results generally. As such, the method may initially utilize keywords, or search terms, expected to appear in a legend or form paragraph. Such keywords may include, for example, "privileged" or "confidential" among others.

The method may then deduplicate and/or group any form paragraphs identified using such keywords so that each is presented to a user only once, and the user may indicate that a candidate form paragraph is, indeed, a legend, or that it should otherwise be excluded from search results.

Accordingly, one example of each potential legend is presented to the user such that the user can indicate that a legend is verified, rejected, or that it should be quarantined for further review. Such classification may be resilient across batches, such that a single database may be utilized across multiple search processes.

Figure 17A:
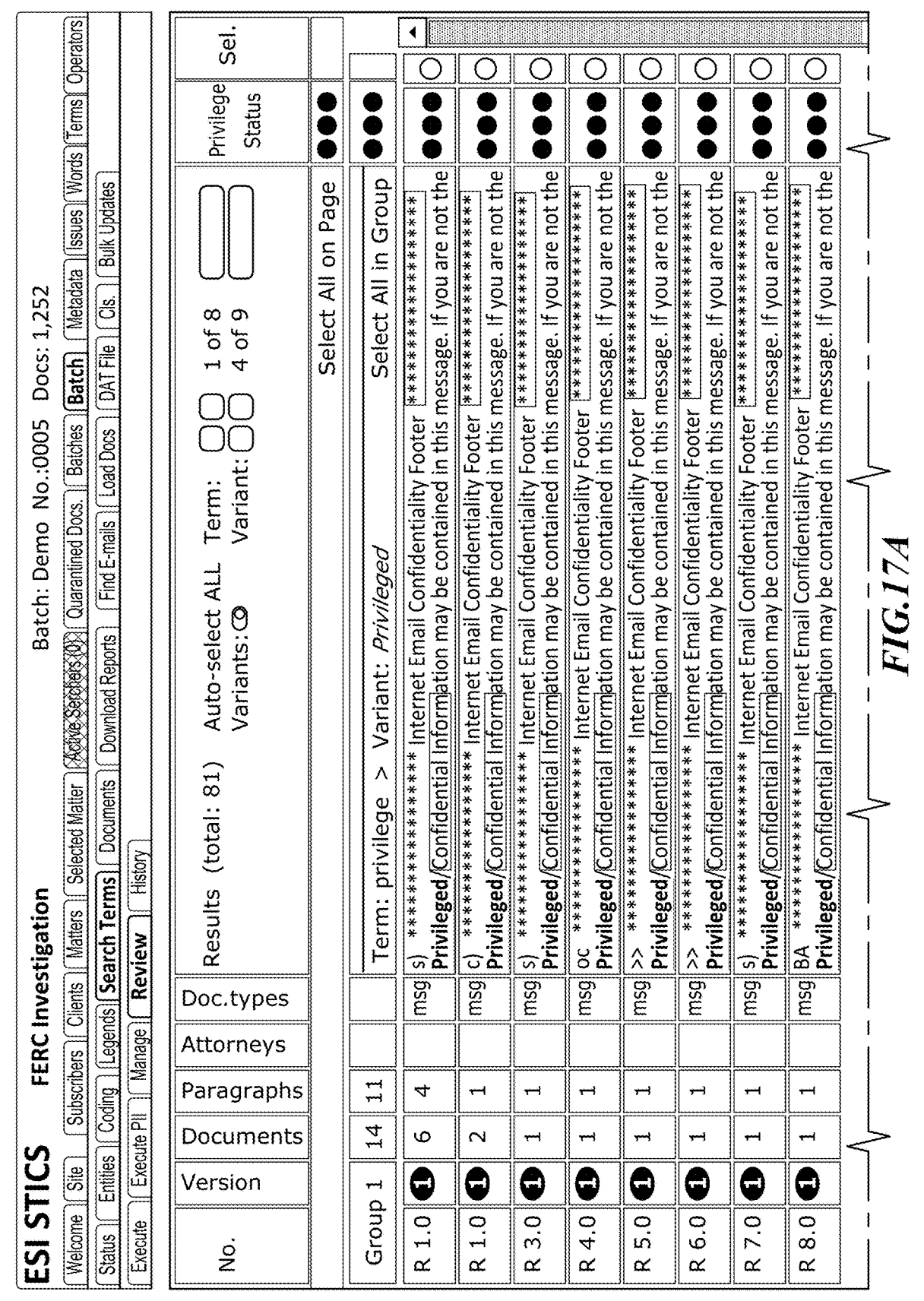

FIGS. 17A-17B illustrate the automatic classification of legends in accordance with this disclosure. As shown, if a search result during a later search is drawn from a verified legend, the corresponding group may be preemptively marked for removal from the initial plurality of search term results. Alternatively, the corresponding group may not be presented to the user at all.

Figure 18A:
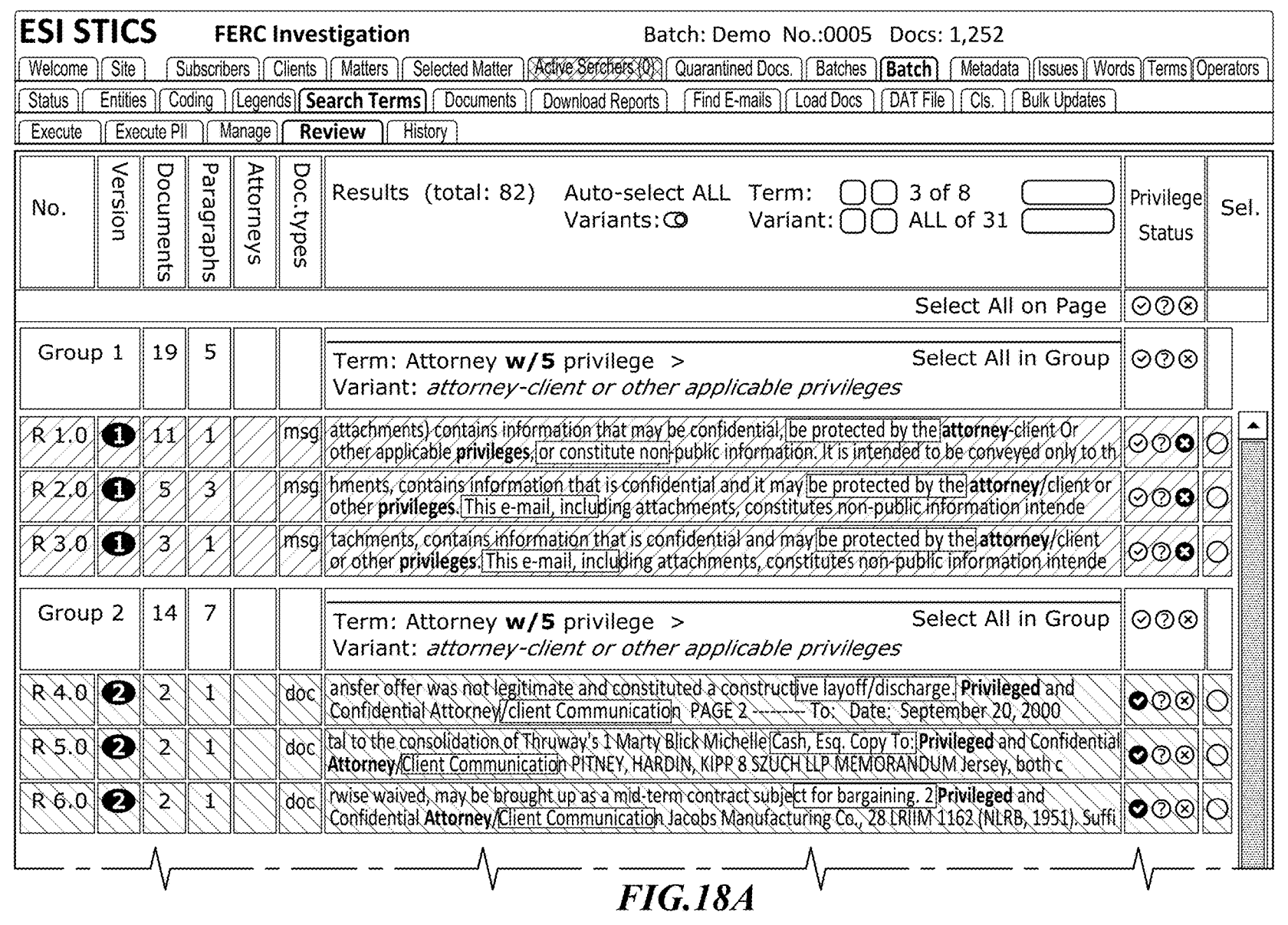
Figure 18B:
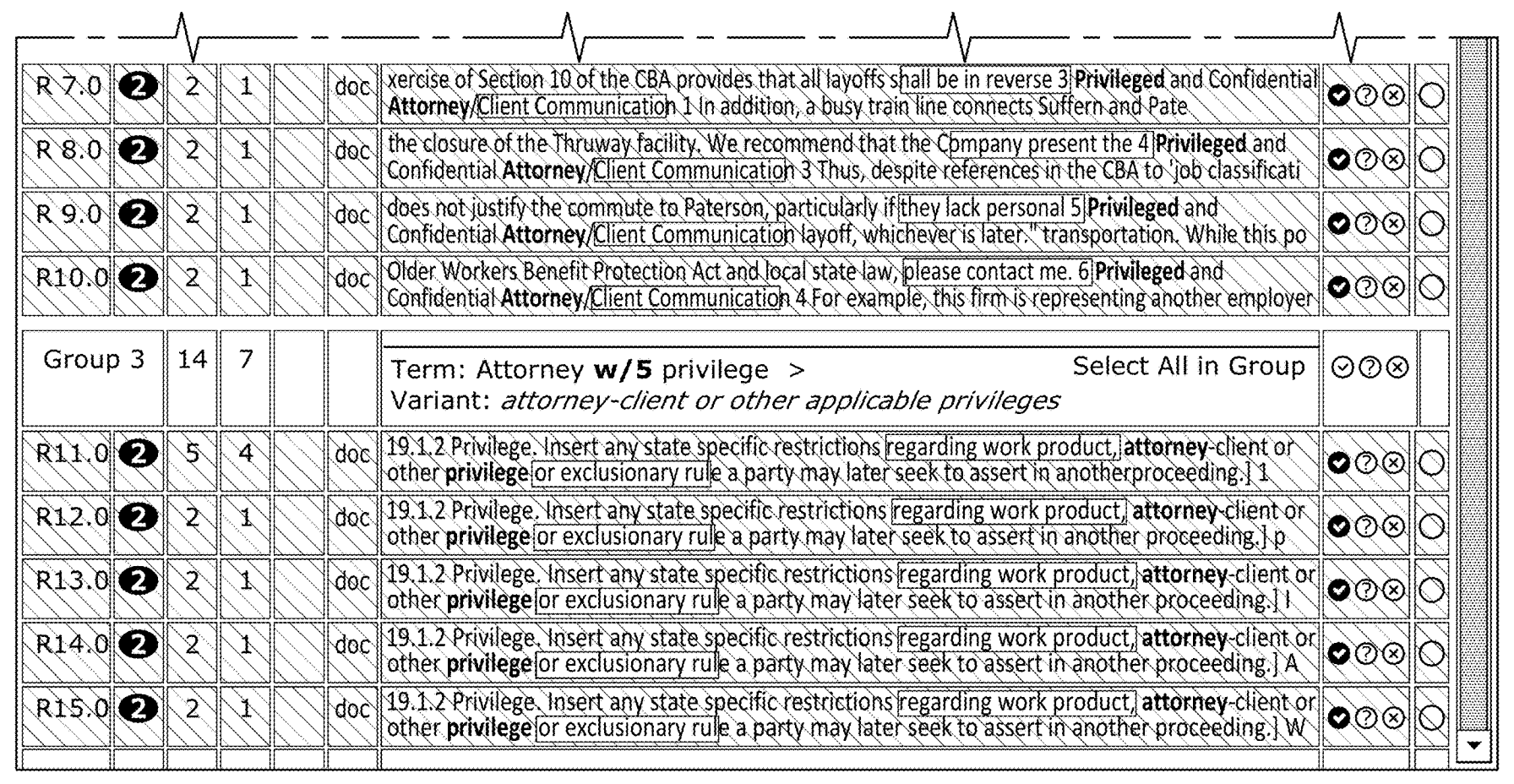

FIGS. 18A-18B illustrate an interface for bulk classification of documents in accordance with this disclosure. As discussed above, a user may be presented with a large number of groups of search term results in a single interface in which all such results may be quickly classified.

Figure 19A:
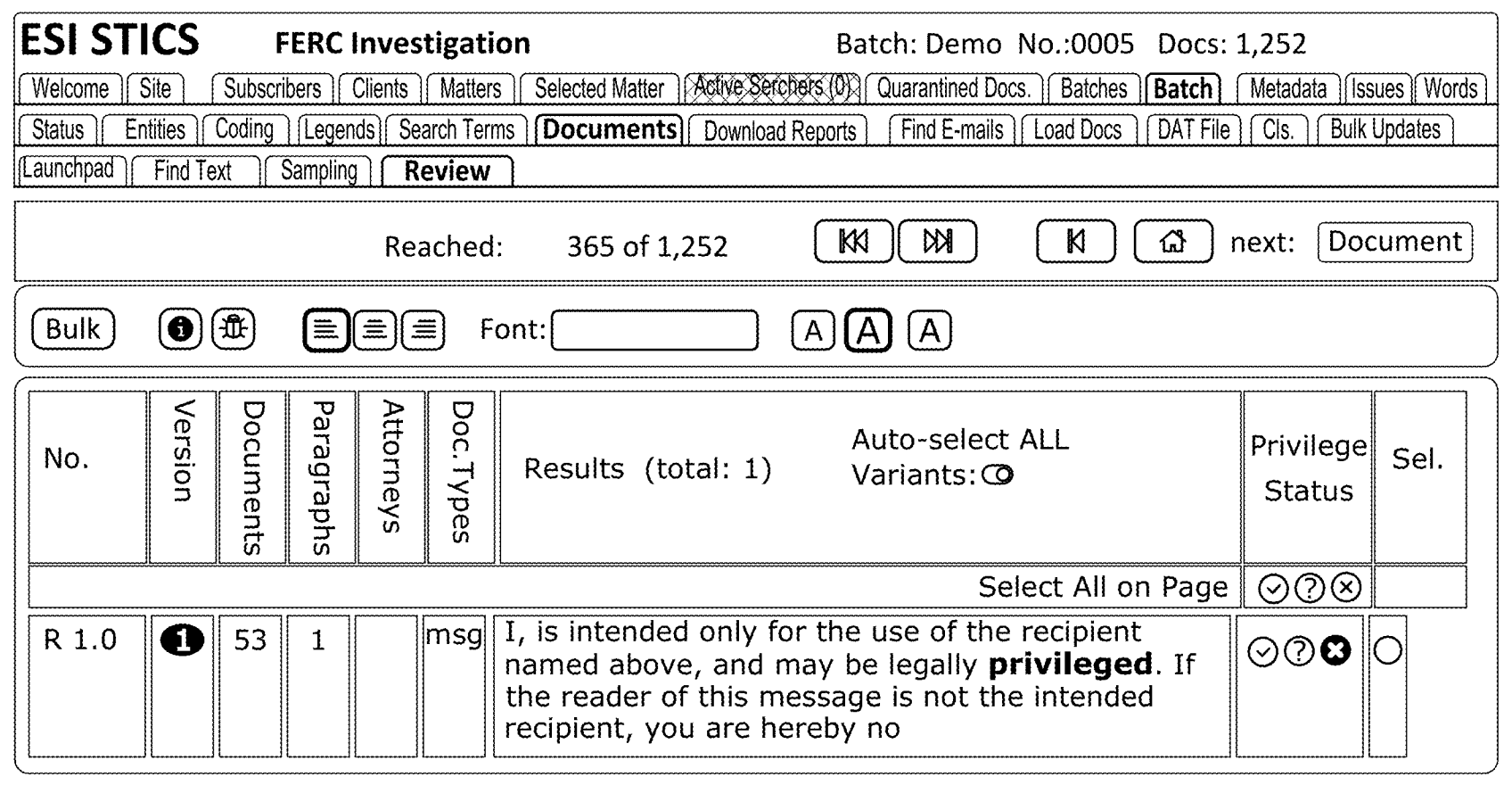

FIGS. 19A-19B illustrate the grouping and categorization of search results by subject matter in accordance with this disclosure. As shown, in some embodiments, where a search term result might otherwise be ambiguous, it may be presented to a user grouped with similarly categorized search term results which may then be classified as a group.

The term "data processing apparatus" and like terms encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Computers may further be provided in other forms, such as in the form of handheld devices or smartphones, as well as in the form of tablet devices. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser. A device for providing interaction with a user may be referred to as a user interface device.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A computer-based method of filtering search results, the method comprising:

identifying a plurality of documents for review;

identifying an initial plurality of search term results potentially relevant to a search query, each search term result of the initial plurality containing an occurrence of a primary search term of a plurality of primary search terms and each search term result of the plurality of search term results being drawn from one of the plurality of documents for review, and wherein each search term result of the plurality of search term results is smaller than the one of the plurality of documents from which it is drawn;

grouping search term results of the initial plurality of search term results that are identical to each other to define a plurality of groups of search term results, such that a first group of search term results of the plurality of groups of search term results comprises search term results different than those of a second group of search term results of the plurality of groups of search term results;

displaying a representative search term result of the first group of search term results for evaluation;

upon receiving an indication from a user that the representative search term result is to be removed, removing all search term results of the first group from the initial plurality of search term results to define a modified plurality of search term results; and defining each document from which any search result of the modified plurality of search term results is drawn as a potentially relevant document, wherein each term result of the plurality of search term results is larger than the search term, such that search results are defined as identical only if contents of the search term results other than the search term are identical, wherein, upon receiving an indication from the user that the representative search term result is ambiguous, displaying a document component containing the search term result to the user, wherein the component is larger than the corresponding search term result but smaller than the document from which the search term result is drawn, and wherein, upon receiving a further indication from the user that the document component is to be removed, removing the corresponding representative search term result from the at least one group of search term results and defining a different search term result from the group of search term results as the representative search term result for display to the user.

2. The method of claim 1 wherein each search term result is either a sentence containing the corresponding search term or is the corresponding search term combined with a previously defined number of leading or following characters.

3. The method of claim 1, wherein multiple search term results are drawn from a single document of the plurality of documents for review, such that the document is defined as potentially relevant to the search query so long as any single search term result associated with the corresponding document remains in the modified plurality of search term results.

4. The method of claim 1 further comprising displaying a representative search term result for each group of the plurality of groups of search term results and receiving an indication from the user that the corresponding representative search term result is relevant to the search query or that the corresponding representative search term result is to be removed.

5. The method of claim 1 further comprising displaying a representative search term result for each group of the plurality of groups of search term results and receiving an indication from the user that the corresponding representative search term result is relevant to the search query, that the corresponding representative search term result is to be removed, or that the user cannot make a determination based on the representative search term result.

6. The method of claim 1 further comprising identifying at least one form paragraph prior to identifying the initial plurality of search term results and defining a search term result as part of the initial plurality of search term results only upon determining that the corresponding search term result is not drawn from the at least one form paragraph.

7. The method of claim 1 further comprising identifying at least one form paragraph prior to identifying the initial plurality of search term results and preemptively indicating to a user that a particular representative search term result presented for evaluation is drawn from the at least one form paragraph.

8. The method of claim 1 further comprising displaying each potentially relevant document to the user for further review and receiving an indication from the user that the corresponding document is either relevant or irrelevant.

9. The method of claim 1 further comprising, upon defining a group of potentially relevant documents:

identifying at least one document of the group of potentially relevant documents as containing a secondary search term, and retaining the at least one document for further review.

10. The method of claim 9 wherein the further review identifies the document as at least partially privileged or confidential and implements a redaction process.

11. The method of claim 9 wherein the secondary search terms comprise names or contact information extracted from the plurality of documents for review.

12. The method of claim 11, wherein the names or contact information are extracted from a load file accompanying batches of documents or wherein the names or contact information are extracted from body text using Regular Expressions, Email Parsing Libraries, Natural Language Processing (NLP), Machine Learning, or third-party APIs.

13. The method of claim 11 further comprising:

extracting names or contact information from email header information of the plurality of documents for review;

generating a map illustrating communications between parties associated with each name or contact information extracted, the map based on indications that emails were transmitted between those parties or that those parties were copied on the same communications;

displaying the map to the user; and receiving an indication from the user that at least one name or contact information visualized in the map should be included as a secondary search term.

14. The method of claim 1 further comprising processing the documents of the plurality of documents for review prior to identifying the initial plurality of search term results, wherein processing includes lemmatization of the corresponding documents, and wherein at least one primary search term is a lemma.

15. The method of claim 1 further comprising processing the documents of the plurality of documents for review prior to identifying the initial plurality of search term results, wherein processing includes normalization, sentence tokenization, or removal of stop words.

16. The method of claim 1 wherein each primary search term of the plurality of primary search terms is one of a single word, a continuous series of words, or a plurality of words located within a threshold number of words of each other.

17. The method of claim 1 further comprising the generation of additional search term results from the initial plurality of search term results via human or artificial intelligence supplementation.

18. The method of claim 1 wherein the identification of the initial plurality of search term results potentially responsive to the search query is based on a Boolean comparison of each of the plurality of primary search terms to each of the plurality of documents.

19. A computer based method of filter search results, the method comprising:
identifying a plurality of documents for review;
identifying an initial plurality of search term results potentially to a search query, each search term result of the initial plurality containing an occurrence of a primary search term of a plurality of primary search terms and each search term result of the plurality of search term results being drawn from one of the plurality of documents for review, and wherein each search term result of the plurality of search term results is smaller than the one of the plurality of documents from which it is drawn;
grouping search term results of the initial plurality of search term results that are identical to each other to define a plurality of groups of search term results, such that a first group of search term results of the plurality of groups of search term results comprises search term results different than those of a second group of search term results of the plurality of group of search term results;
displaying a representative search term result of the first group of search term results for evaluation,
upon receiving an indication from a user that the representative search term result is to be removed, removing all search term results of the first group from the initial plurality of search term results to define a modified plurality of search results;
defining each document from which any search result of the modified plurality of search term results is drawn as a potentially relevant document; and
upon defining a group of potentially relevant documents, identifying at least one document of the group of potentially relevant documents as containing a secondary search term, and retaining the at least one document for further review, wherein the secondary search terms comprise names or contact information extracted from the plurality of documents for review,
the method further comprising extracting the names or contact information from header information of the plurality of documents for review;
for each name extracted, retrieving secondary information from a data source external to the plurality of documents; and
determining, based on the secondary information, whether to include the corresponding name or contact information as a secondary search term.

20. The method of claim 19, wherein the data source external to the plurality of documents is the internet or an external database.

* * * * *